United States Patent
Mori et al.

(10) Patent No.: US 12,528,540 B2
(45) Date of Patent: Jan. 20, 2026

(54) ELECTRIC POWER STEERING DEVICE INCLUDING ROTATION ANGLE DETECTION DEVICE

(71) Applicant: Mitsubishi Electric Corporation, Tokyo (JP)

(72) Inventors: Tatsuya Mori, Tokyo (JP); Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1257 days.

(21) Appl. No.: 17/312,115

(22) PCT Filed: Jan. 22, 2019

(86) PCT No.: PCT/JP2019/001738
§ 371 (c)(1),
(2) Date: Jun. 9, 2021

(87) PCT Pub. No.: WO2020/152762
PCT Pub. Date: Jul. 30, 2020

(65) Prior Publication Data
US 2022/0024517 A1    Jan. 27, 2022

(51) Int. Cl.
*B62D 15/02* (2006.01)
*B62D 5/04* (2006.01)
(Continued)

(52) U.S. Cl.
CPC ......... *B62D 15/021* (2013.01); *B62D 5/0463* (2013.01); *B62D 6/00* (2013.01); *G01B 7/30* (2013.01); *G01D 5/24476* (2013.01)

(58) Field of Classification Search
CPC ...... B62D 15/021; B62D 5/0463; B62D 6/00; G01B 7/30; G01D 5/24476; G01D 3/02; G01D 5/204
See application file for complete search history.

(56) References Cited

U.S. PATENT DOCUMENTS

| 2009/0167296 A1 | 7/2009 | Yokokawa |
|---|---|---|
| 2014/0036250 A1 | 2/2014 | Okada |

(Continued)

FOREIGN PATENT DOCUMENTS

| DE | 10 2015 215 510 A1 | 2/2016 |
|---|---|---|
| EP | 1 647 811 A1 | 4/2006 |

(Continued)

OTHER PUBLICATIONS

International Search Report for PCT/JP2019/001738 dated Mar. 12, 2019 (PCT/ISA/210).

(Continued)

*Primary Examiner* — Walter L Lindsay, Jr.
*Assistant Examiner* — Geoffrey T Evans
(74) *Attorney, Agent, or Firm* — Sughrue Mion, PLLC

(57) ABSTRACT

Provided is a rotation angle detection device including: a coefficient identification unit configured to identify, based on a sine signal and a cosine signal which are based on a rotation angle of a rotating body, coefficients of frequency components included in the sine signal and the cosine signal; a correction value calculation unit; and a rotation angle calculation unit. The coefficient identification unit is configured to identify, for each of integers M and N which satisfy a relationship in which M+N is equal to a positive constant, and each of which is equal to or larger than 0, a coefficient of each of (M+N−1)th order components included in the sine signal and the cosine signal, based on results of application of low-pass filters to products of an M-th power of the sine signal and an N-th power of the cosine signal.

8 Claims, 11 Drawing Sheets

(51) Int. Cl.
   *B62D 6/00*   (2006.01)
   *G01B 7/30*   (2006.01)
   *G01D 5/244*  (2006.01)

(56) References Cited

U.S. PATENT DOCUMENTS

| | | |
|---|---|---|
| 2017/0030742 A1 | 2/2017 | Mochizuki et al. |
| 2017/0153127 A1 | 6/2017 | Gleissberg et al. |
| 2017/0199056 A1* | 7/2017 | Granig .................. G01D 5/145 |
| 2017/0317618 A1 | 11/2017 | Mizoguchi et al. |
| 2018/0022386 A1* | 1/2018 | Watanabe .............. B62D 5/049 |
| | | 702/151 |
| 2018/0245914 A1* | 8/2018 | Furukawa .............. G01B 21/22 |
| 2018/0252511 A1* | 9/2018 | Furukawa ................ H02P 6/10 |
| 2018/0292197 A1 | 10/2018 | Furukawa et al. |
| 2019/0009816 A1* | 1/2019 | Moreillon ................ B62D 6/08 |
| 2020/0025551 A1* | 1/2020 | Mochizuki ........... G01B 21/045 |
| 2021/0146991 A1* | 5/2021 | Furukawa ................ H02P 21/22 |
| 2025/0060210 A1* | 2/2025 | Franke ................... G01D 5/145 |

FOREIGN PATENT DOCUMENTS

| | | |
|---|---|---|
| EP | 2 754 998 A1 | 7/2014 |
| EP | 3 367 069 A1 | 8/2018 |
| JP | 2007-304000 A | 11/2007 |
| JP | 2008-273478 A | 11/2008 |
| JP | 2013-205366 A | 10/2013 |
| JP | 2014-032105 A | 2/2014 |
| JP | 2017-032394 A | 2/2017 |
| WO | 2017/090146 A1 | 6/2017 |

OTHER PUBLICATIONS

Extended European Search Report issued Dec. 22, 2021 in European Application No. 19912010.6.

* cited by examiner

ELECTRIC POWER STEERING DEVICE INCLUDING ROTATION ANGLE DETECTION DEVICE

CROSS REFERENCE TO RELATED APPLICATIONS

This application is a National Stage of International Application No. PCT/JP2019/001738 filed Jan. 22, 2019.

TECHNICAL FIELD

The present invention relates to a rotation angle detection device, and more particularly, to a rotation angle detection device configured to detect a rotation angle of a rotating body based on a sine signal and a cosine signal. The present invention also relates to an electric power steering device including the rotation angle detection device.

BACKGROUND ART

As means for detecting a rotation angle of a rotating body, for example, a motor, a resolver, a magneto resistance (MR) sensor, and the like are widely used. In those means, a sine signal and a cosine signal are output based on the rotation angle of the rotating body. A rotation angle detection device detects the rotation angle of the rotating body based on the sine signal and the cosine signal (for example, see Patent Literature 1).

The rotation angle detection device described in Patent Literature 1 reads a value of the peak and a value of the valley of each of the sine signal and the cosine signal, and calculates center point correction values each from a difference between a middle point between the value of the peak and the value of the valley and a center point value determined in advance. The rotation angle detection device adds the center point correction value to each of the sine signal and the cosine signal to correct the sine signal and the cosine signal, and detects the rotation angle of the rotating body based on the corrected sine signal and cosine signal.

CITATION LIST

Patent Literature

[PTL 1] JP 2008-273478 A

SUMMARY OF INVENTION

Technical Problem

However, the rotation angle detection device described in Patent Literature 1 does not handle a case in which the sine signal and the cosine signal include frequency components other than fundamental waves. Consequently, in the rotation angle detection device described in Patent Literature 1, when the sine signal and the cosine signal include the frequency components other than the fundamental waves, an error occurs between the rotation angle detected by the rotation angle detection device and an actual rotation angle of the rotating body.

The present invention has been made in order to solve the above-mentioned problem, and has an object to provide a rotation angle detection device capable of suppressing an error caused by frequency components other than fundamental waves being included in a sine signal and a cosine signal.

Solution to Problem

In order to solve the above-mentioned problem, according to one embodiment of the present invention, there is provided a rotation angle detection device including: a coefficient identification unit configured to identify, based on a sine signal and a cosine signal which are based on a rotation angle of a rotating body, coefficients of frequency components included in the sine signal and the cosine signal; a correction value calculation unit configured to calculate correction values based on the coefficients identified by the coefficient identification unit; and a rotation angle calculation unit configured to calculate the rotation angle of the rotating body based on values obtained by correcting one of the sine signal or the cosine signal, or both thereof, through use of the correction values.

Further, according to another embodiment of the present invention, there is provided a rotation angle detection device including: an intermediate signal generation unit configured to generate an intermediate signal based on a product of a sine signal and a cosine signal which are based on a rotation angle of a rotating body; a multiplication unit configured to multiply the intermediate signal by one of the sine signal or the cosine signal; an addition/subtraction unit configured to add the other one of the sine signal or the cosine signal and an output of the multiplication unit to each other or to subtract the output of the multiplication unit from the other one of the sine signal or the cosine signal; and a rotation angle calculation unit configured to calculate the rotation angle of the rotating body based on the one of the sine signal or the cosine signal and an output of the addition/subtraction unit.

Advantageous Effects of Invention

According to the rotation angle detection device of the present invention, it is possible to suppress an error caused by the frequency components other than the fundamental waves being included in the sine signal and the cosine signal.

DESCRIPTION OF EMBODIMENTS

Now, details of embodiments of a rotation angle detection device disclosed in the present application are described with reference to the accompanying drawings. It should be noted, however, that the embodiments described below are merely examples, and the present invention is not limited to those embodiments.

First Embodiment

Figure 1:
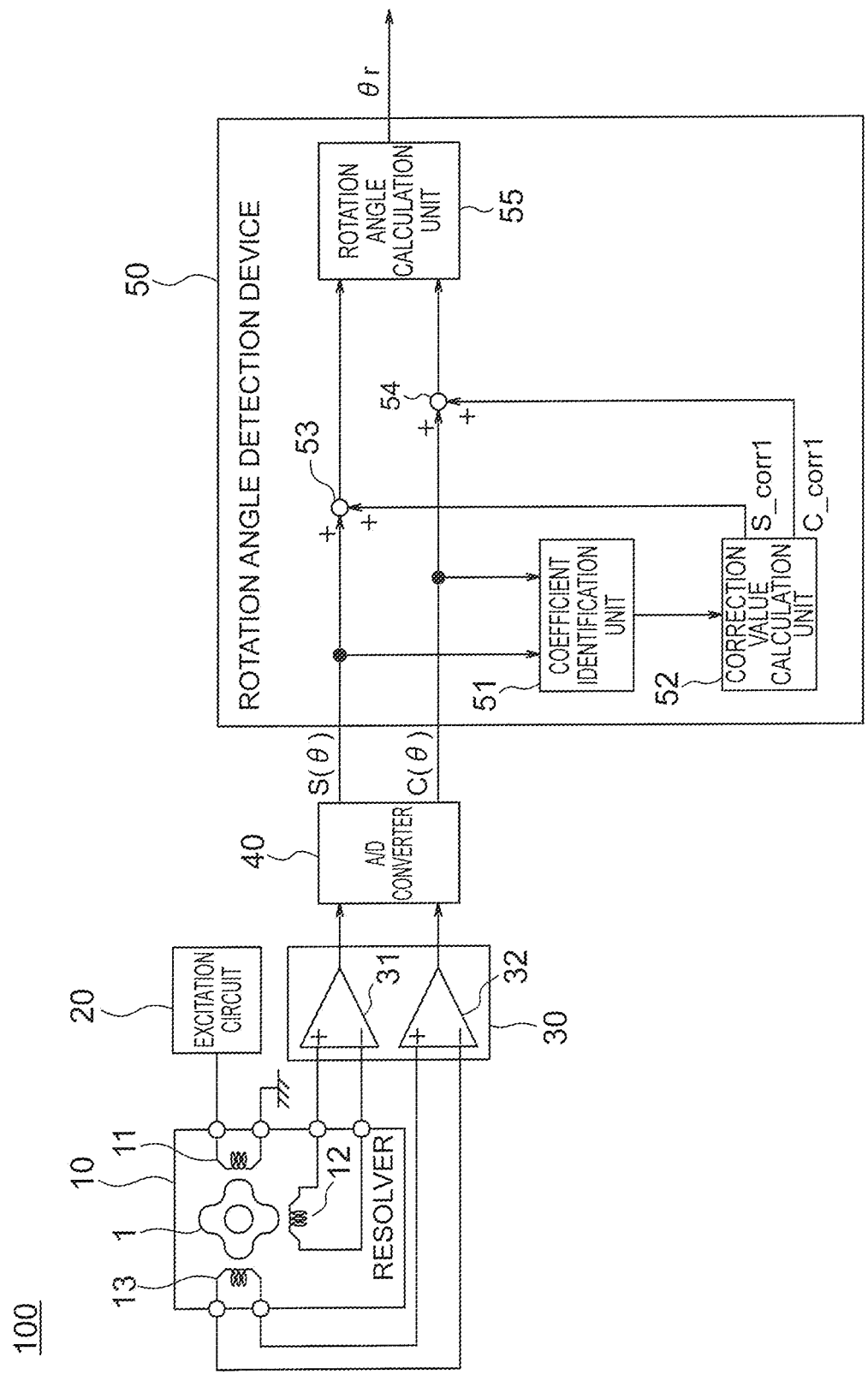
FIG. 1 is a block diagram for illustrating a configuration of a rotation angle detection system including a rotation angle detection device according to a first embodiment of the present invention.

FIG. 1 is a block diagram for illustrating a configuration of a rotation angle detection system 100 including a rotation angle detection device 50 according to a first embodiment of the present invention.

The rotation angle detection system 100 includes a resolver 10, an excitation circuit 20, a differential amplification device 30, an A/D converter 40, and the rotation angle detection device 50.

The resolver 10 includes a rotor 1, an excitation coil 11, a sine detection coil 12, and a cosine detection coil 13. The rotor 1 is configured to rotate along with a motor (not shown). The excitation coil 11 is configured to be driven by an AC signal generated by the excitation circuit 20. The sine detection coil 12 is configured to detect the sine of a rotation angle of the motor. The cosine detection coil 13 is configured to detect the cosine of the rotation angle of the motor.

Figure 2:
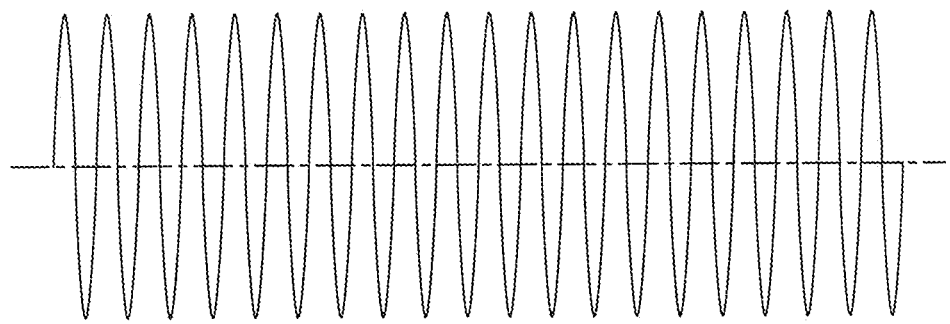
FIG. 2 is a graph for showing a temporal waveform of an AC signal generated by an excitation circuit of FIG. 1.
Figure 3:
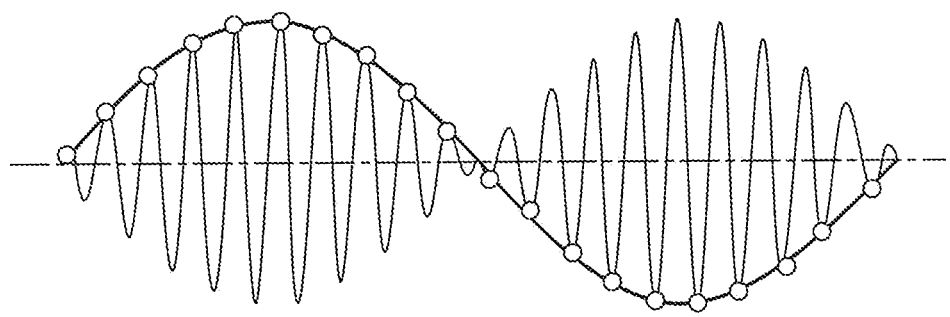
FIG. 3 is a graph for showing a temporal waveform of a signal appearing between output ends of a sine detection coil of FIG. 1.

When the excitation coil 11 is driven by the AC signal as shown in FIG. 2, a signal that is amplitude-modulated by the sine of the rotation angle of the motor is output between output ends of the sine detection coil 12 as shown in FIG. 3. Moreover, a signal amplitude-modulated by the cosine of the rotation angle of the motor is output at output ends of the cosine detection coil 13 as shown in FIG. 4.

Figure 4:
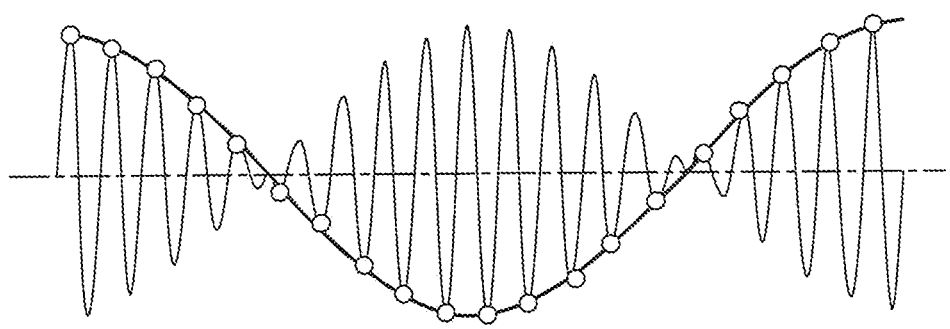
FIG. 4 is a graph for showing a temporal waveform of a signal appearing between output ends of a cosine detection coil of FIG. 1.

Each of the horizontal axes of FIG. 2 to FIG. 4 represents a time axis, and one cycle of the rotation angle of the resolver 10 is shown. Moreover, each of the vertical axes of FIG. 2 to FIG. 4 represents the amplitude of each signal.

Referring back to FIG. 1, the signal between both of the output ends of the sine detection coil 12 is differentially amplified by a first differential amplifier 31 included in the differential amplification device 30, and is then input to the A/D converter 40. Similarly, the signal between both of the output ends of the cosine detection coil 13 is differentially amplified by a second differential amplifier 32 included in the differential amplification device 30, and is then input to the A/D converter 40.

In the A/D converter 40, each peak point of a sine value and a cosine value indicated by each circle of FIG. 3 and FIG. 4, respectively, that is, each peak point of the sine value and the cosine value detected by the differential amplifier 30, is A/D-converted. After that, a sine signal $S(\theta)$ and a cosine signal $C(\theta)$ indicated by the thick lines of FIG. 3 and FIG. 4 are obtained from signal sequences formed by connecting those peak points. Symbol $\theta$ represents the rotation angle of the motor.

When there exists a difference between the amplitude of the sine signal $S(\theta)$ and the amplitude of the cosine signal $C(\theta)$ output from the A/D converter 40, such correction that the difference therebetween approaches zero may be made.

Referring back to FIG. 1, each of the sine signal $S(\theta)$ and the cosine signal $C(\theta)$ output from the A/D converter 40 is input to the rotation angle detection device 50.

The rotation angle detection device 50 includes a coefficient identification unit 51, a correction value calculation unit 52, an addition unit 53, an addition unit 54, and a rotation angle calculation unit 55.

The coefficient identification unit 51 identifies and outputs coefficients of a 0th order component and a second order component included in each of the sine signal $S(\theta)$ and the cosine signal $C(\theta)$ based on the sine signal $S(\theta)$ and the cosine signal $C(\theta)$.

Figure 5:
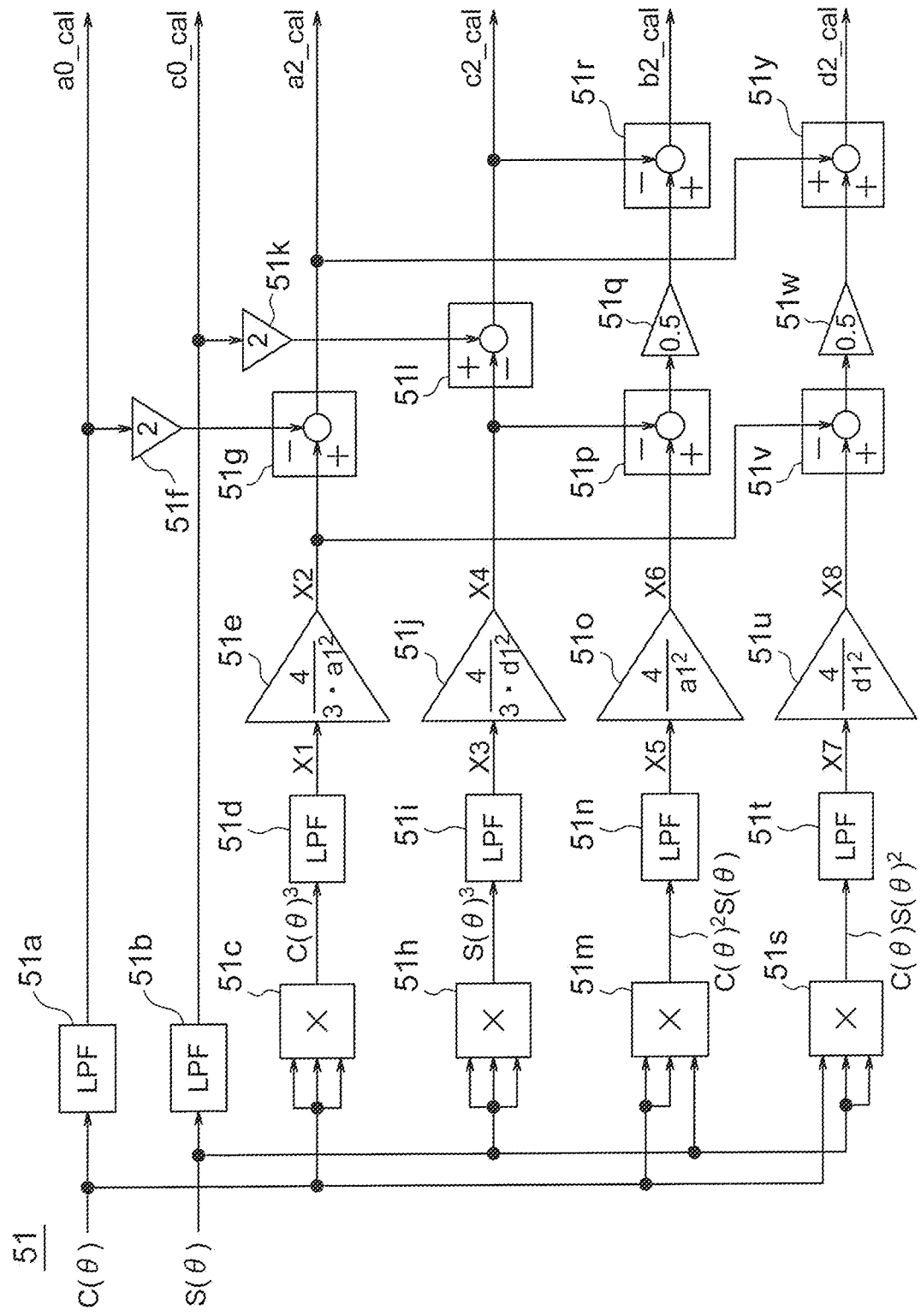
FIG. 5 is a block diagram for illustrating an internal configuration of a coefficient identification unit of FIG. 1.

FIG. 5 is a block diagram for illustrating an internal configuration of the coefficient identification unit 51 in the first embodiment. A detailed description is now given of each component and an operation of the coefficient identification unit 51.

A low-pass filter 51a outputs a value a0_cal obtained by applying low-pass filtering to the cosine signal $C(\theta)$. The value a0_cal is an identified value of a coefficient of a 0th order component included in the cosine signal $C(\theta)$, that is, a DC component thereof.

A low-pass filter 51b outputs a value c0_cal obtained by applying low-pass filtering to the sine signal $S(\theta)$. The value c0_cal is an identified value of a coefficient of a 0th order component included in the sine signal $S(\theta)$, that is, a DC component thereof.

After that, a multiplier 51c outputs a value $C(\theta)^3$ being a third power of the cosine signal $C(\theta)$.

A low-pass filter 51d outputs a value X1 obtained by applying low-pass filtering to the value $C(\theta)^3$ being the third power of the cosine signal $C(\theta)$.

A gain 51e outputs a value X2 being $(4/(3 \times a1^2))$-times the output X1 of the low-pass filter 51d. The value a1 is a coefficient of a first order component of the cosine signal $C(\theta)$, that is, a fundamental wave component thereof. As the value a1, it is only required to use a design value or a value measured in advance.

A gain 51f outputs a value a0_cal×2 being twice a0_cal.

A subtractor 51g outputs a value a2 cal obtained by subtracting the output a0_cal×2 of the gain 51f from the output X2 of the gain 51e. The value a2 cal is an identified value of a coefficient of a second order component included in the cosine signal $C(\theta)$.

After that, a multiplier 51h outputs a value $S(\theta)^3$ being a third power of the sine signal $S(\theta)$.

A low-pass filter 51i outputs a value X3 obtained by applying low-pass filtering to the value $S(\theta)^3$ being the third power of the sine signal $S(\theta)$.

A gain 51*j* outputs a value X4 being $(4/(3 \times d1^2))$-times the output X3 of the low-pass filter 51*i*. The value d1 is a coefficient of a first order component of the sine signal $S(\theta)$, that is, a fundamental wave component thereof. As the value d1, it is only required to use a design value or a value measured in advance.

A gain 51*k* outputs a value c0_cal×2 being twice c0_cal.

A subtractor 51*l* outputs a value c2_cal obtained by subtracting the output c0_cal×2 of the gain 51*k* from the output X4 of the gain 51*j*. The value c2_cal is an identified value of a coefficient of a second order component included in the sine signal $S(\theta)$.

After that, a multiplier 51*m* outputs a product $C(\theta)^2 S(\theta)$ of the second power of the cosine signal $C(\theta)$ and the sine signal $S(\theta)$.

A low-pass filter 51*n* outputs a value X5 obtained by applying low-pass filtering to the value $C(\theta)^2 S(\theta)$.

A gain 51*o* outputs a value X6 being $(4/a1^2)$-times the output X5 of the low-pass filter 51*n*. The value a1 is a coefficient of a first order component of the cosine signal $C(\theta)$, that is, a fundamental wave component thereof. As described above, as the value a1, it is only required to use a design value or a value measured in advance.

A subtractor 51*p* outputs a value obtained by subtracting the output X4 of the gain 51*j* from the output X6 of the gain 51*o*.

A gain 51*q* outputs a value being 0.5 time the output of the subtractor 51*p*.

A subtractor 51*r* outputs a value b2_cal obtained by subtracting the c2_cal from the output of the gain 51*q*. The value b2_cal is an identified value of a coefficient of a second order component included in the cosine signal $C(\theta)$.

After that, a multiplier 51*s* outputs a product $C(\theta) S(\theta)^2$ of the cosine signal $C(\theta)$ and the second power of the sine signal $S(\theta)$.

A low-pass filter 51*t* outputs a value X7 obtained by applying low-pass filtering to the value $C(O)S(\theta)^2$.

A gain 51*u* outputs a value X8 being $(4/d1^2)$-times the output X7 of the low-pass filter 51*t*. The value d1 is a coefficient of a first order component of the sine signal $S(\theta)$, that is, a fundamental wave component thereof. As described above, as the value d1, it is only required to use a design value or a value measured in advance.

A subtractor 51*v* outputs a value obtained by subtracting the output X2 of the gain 51*e* from the output X8 of the gain 51*u*.

A gain 51*w* outputs a value being 0.5 time the output of the subtractor 51*v*.

An adder 51*y* outputs a value d2_cal obtained by adding a0_cal to the output of the gain 51*w*. The value d2_cal is an identified value of a coefficient of a second order component included in the sine signal $S(\theta)$.

Thus, the coefficient identification unit 51 outputs the six coefficient identified values a0_cal, c0_cal, a2 cal, c2_cal, b2_cal, and d2_cal.

The coefficient identification unit 51 applies the low-pass filtering to the first power of the cosine signal $C(\theta)$, to thereby identify the coefficient a0_cal of the 0th order component included in the cosine signal $C(\theta)$. Moreover, the coefficient identification unit 51 applies the low-pass filtering to the first power of the sine signal $S(\theta)$, to thereby identify the coefficient c0_cal of the 0th order component included in the sine signal $S(\theta)$.

In summary, the coefficient identification unit 51 identifies, for each of integers M and N which satisfy a relationship in which M+N is equal to 1, and each of which is equal to or larger than 0, the coefficients a0_cal and c0_cal of the (M+N−1)th order components included in the sine signal $S(\theta)$ and the cosine signal $C(\theta)$, that is, the 0th order components thereof, based on the results of the application of the low-pass filters to the products of the M-th power of the sine signal and the N-th power of the cosine signal.

Moreover, the coefficient identification unit 51 identifies the coefficients a2 cal, c2_cal, b2_cal, and d2_cal of the second order components included in the sine signal $S(\theta)$ and the cosine signal $C(\theta)$, based on the results of the application of the low-pass filters to the third power of the sine signal, the third power of the cosine signal, the product of the second power of the cosine signal and the first power of the sine signal, and the product of the second power of the sine signal and the first power of the sine signal, respectively.

In summary, the coefficient identification unit 51 identifies, for each of integers M and N, which satisfy a relationship in which M+N is equal to 3, and each of which is equal to or larger than 0, the coefficients a2_cal, c2_cal, b2_cal, and d2_cal of the (M+N−1)th order components included in the sine signal $S(\theta)$ and the cosine signal $C(\theta)$, that is, the second order components thereof, based on the results of the application of the low-pass filters to the products of the M-th power of the sine signal and the N-th power of the cosine signal.

Referring back to FIG. 1, the six coefficient identified values a0_cal, c0_cal, a2_cal, c2_cal, b2_cal, and d2_cal output from the coefficient identification unit 51 are input to the correction value calculation unit 52.

The correction value calculation unit 52 calculates a correction value S_carr1 for the sine signal $S(\theta)$ and a correction value C_carr1 for the cosine signal $C(\theta)$ based on the six coefficient identification values input from the coefficient identification unit 51.

Figure 6:
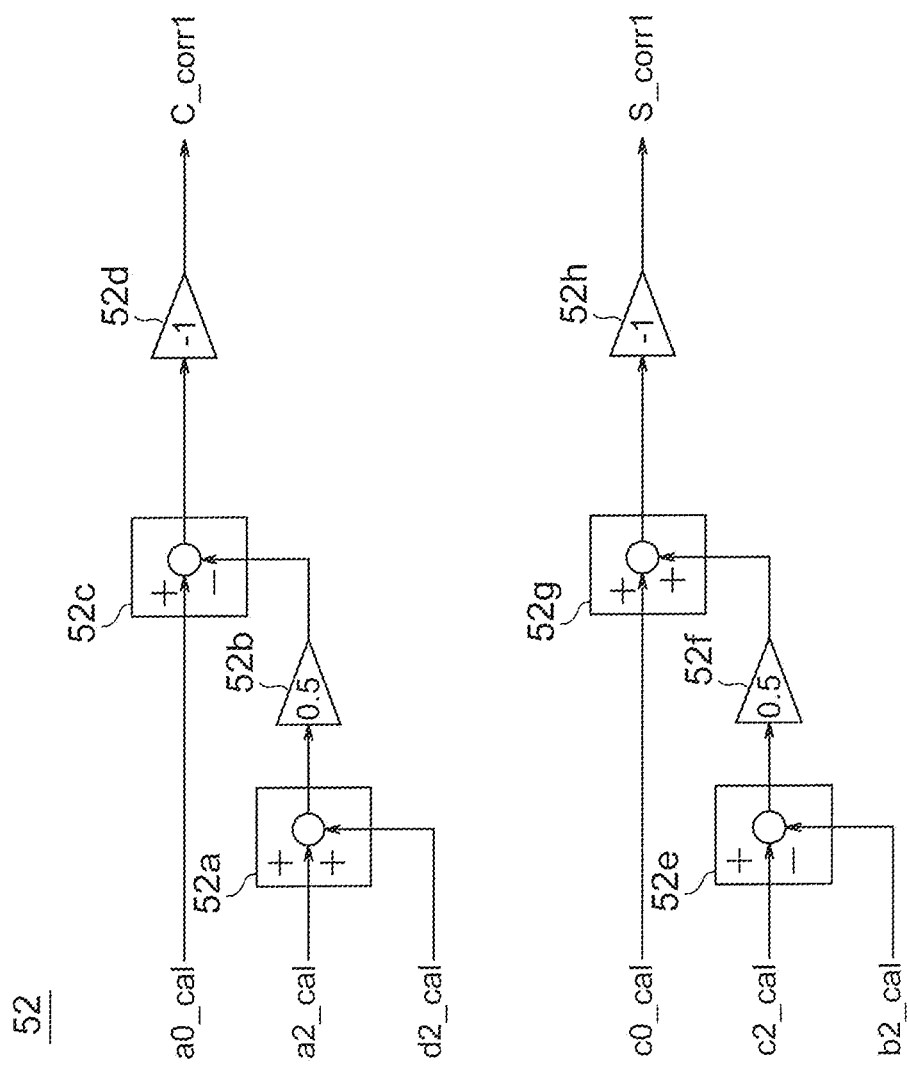
FIG. 6 is a block diagram for illustrating an internal configuration of a correction value calculation unit of FIG. 1.

FIG. 6 is a block diagram for illustrating an internal configuration of the correction value calculation unit 52 in the first embodiment. Description is now given of each component and an operation of the correction value calculation unit 52.

First, an adder 52*a* adds a2_cal and d2_cal input from the coefficient identification unit 51 to each other, and outputs an addition result a2_cal+d2_cal.

A gain 52*b* multiplies the output of the adder 52*a* by 0.5, and outputs a multiplication result 0.5 (a2_cal+d2_cal).

A subtractor 52*c* subtracts the output of the gain 52*b* from a0_cal input from the coefficient identification unit 51, and outputs a subtraction result a0_cal−0.5 (a2_cal+d2_cal).

A gain 52*d* multiples the output of the subtractor 52*c* by −1, and outputs a result as C_corr1.

Thus, the correction value C_corr1 for the cosine signal $C(\theta)$ output from the correction value calculation unit 52 is given as below.

$$C\_corr1 = -a0\_cal + 0.5(a2\_cal + d2\_cal) \quad (1)$$

After that, a subtractor 52*e* subtracts b2_cal from c2_cal input from the coefficient identification unit 51, and outputs a subtraction result c2_cal−b2_cal.

A gain 52*f* multiplies the output of the subtractor 52*e* by 0.5, and outputs a multiplication result 0.5 (c2_cal−b2_cal).

An adder 52*g* adds c0_cal input from the coefficient identification unit 51 to the output of the gain 52*f*, and outputs an addition result c0_cal+0.5 (−b2_cal+c2_cal).

A gain 52*h* multiplies the output of the adder 52*g* by −1, and outputs a result as S_corr1.

Thus, the correction value S_corr1 for the sine signal S(θ) output from the correction value calculation unit 52 is given as below.

$$C\_corr1 = -a0\_cal + 0.5(a2\_cal + d2\_cal) \quad (2)$$

Referring back to FIG. 1, the correction value S_corr1 output from the correction value calculation unit 52 is input to the addition unit 53. The addition unit 53 adds the sine signal S(θ) and the correction value S_corr1 to each other, and outputs the sum to the rotation angle calculation unit 55.

The correction value C_corr1 output from the correction value calculation unit 52 is input to the addition unit 54. The addition unit 54 adds the cosine signal C(θ) and the correction value C_corr1 to each other, and outputs the sum to the rotation angle calculation unit 55.

The rotation angle calculation unit 55 calculates a rotation angle signal θr as given by the following expression based on S(θ)+S_corr1 and C(θ)+C_corr1.

$$\theta_r = \tan^{-1}\left(\frac{S(\theta) + S\_corr1}{C(\theta) + C\_corr1}\right)$$

A detailed description is now given of a reason for the point that a rotation angle error caused by the frequency components other than the fundamental waves being included in the sine signal S(θ) and the cosine signal C(θ) is suppressed in the rotation angle detection device 50 described above.

First, consideration is given of a case in which the cosine signal C(θ) and the sine signal S(θ) are given as below, respectively.

$$C(\theta) = \cos(\theta) \quad (4)$$

$$S(\theta) = \sin(\theta) \quad (5)$$

In this case, the coefficient of the 0th order component of the cosine signal C(θ), that is, the DC component thereof is zero. Moreover, the coefficients of harmonic wave components other than the fundamental wave of the cosine signal C(θ) are also zero. The coefficient of the fundamental wave component, that is, the first order component thereof is 1.

Similarly, the coefficient of the 0th order component of the sine signal S(θ), that is, the DC component thereof is zero. Moreover, the coefficients of harmonic wave components other than the fundamental wave of the sine signal S(θ) are also zero. The coefficient of the fundamental wave component, that is, the first order component thereof is 1.

In this case, consideration is given of a case in which it is assumed that the correction values C_corr1 and S_corr1 for the cosine signal C(θ) and the sine signal S(θ) are 0 and 0, respectively. Based on this assumption, the rotation angle signal θr is calculated from Expression (3) as given below.

$$\theta_r = \tan^{-1}\left(\frac{\sin(\theta)}{\cos(\theta)}\right) = \theta \quad (6)$$

Thus, the rotation angle signal θr is equal to the actual rotation angle θ of the motor. Moreover, a rotation angle error Δθ obtained based on a difference between the rotation angle signal θr and the actual rotation angle θ of the motor is zero.

Consideration is now given of a case in which the cosine signal C(θ) and the sine signal S(θ) are given as below, respectively. Expression (4) and Expression (5), and Expression (7) and Expression (8) are different from each other in a point that 0th order components, that is, DC components exist.

$$C(\theta) = a0 + \cos(\theta) \quad (7)$$

$$S(\theta) = c0 + \sin(\theta) \quad (8)$$

Also in this case, consideration is given of the case in which it is assumed that the correction values C_corr1 and S_corr1 for the cosine signal C(θ) and the sine signal S(θ) are 0 and 0, respectively. Based on this assumption, the rotation angle signal θr is calculated as given by Expression (3), and the rotation angle error Δθ is obtained as given below based on the rotation angle signal θr.

$$\Delta\theta = c0 \cdot \cos(\theta) - a0 \cdot \sin(\theta) \quad (9)$$

That is, the occurrence of the rotation angle error Δθ having the same cycle as that of the fundamental waves of the sine signal S(θ) and the cosine signal C(θ) is caused by the fact that the 0th order components a0 and c0 are included in the cosine signal C(θ) and the sine signal S(θ), respectively.

The rotation angle error having the same cycle as that of the fundamental waves of the sine signal S(θ) and the cosine signal C(θ) is hereinafter referred to as "rotation angle error of 1f." Moreover, a rotation angle error having the same cycle as that of the second order components of the sine signal S(θ) and the cosine signal C(θ) is hereinafter referred to as "rotation angle error of 2f." Rotation angle errors of 3f and 4f are similarly defined.

In Patent Literature 1, a center point correction value is obtained from a value of the peak and a value of the valley of each of the sine signal S(θ) and the cosine signal C(θ). When the calculation is executed in accordance with this configuration, the correction values C_corr1 and S_corr1 are given by −a0 and −c0, respectively. In this case, the rotation angle signal θr is calculated from Expression (3) as given below.

$$\theta_r = \tan^{-1}\left(\frac{S(\theta) + S\_corr1}{C(\theta) + C\_corr1}\right) = \tan^{-1}\left(\frac{(c0 + \sin(\theta)) - c0}{(a0 + \cos(\theta)) - a0}\right) = \tan^{-1}\left(\frac{\sin(\theta)}{\cos(\theta)}\right) = \theta \quad (10)$$

Thus, when the 0th order components a0 and c0 are included in the cosine signal C(θ) and the sine signal S(θ), respectively, the rotation angle error Δθ can be suppressed through the method of Patent Literature 1.

Consideration is now given of a case in which the cosine signal C(θ) and the sine signal S(θ) are given as below, respectively. Expression (7) and Expression (8), and Expression (11) and Expression (12) are different from each other in a point that the second order components, that is, the frequency components having the frequency twice as high as the frequency of the fundamental waves exist.

$$C(\theta) = a0 + \cos(\theta) + a2 \cdot \cos(2\theta) + b2 \cdot \sin(2\theta) \quad (11)$$

$$S(\theta) = c0 + \sin(\theta) + c2 \cdot \cos(2\theta) + d2 \cdot \sin(2\theta) \quad (12)$$

Similarly, consideration is given of the case in which it is assumed that the correction values C_corr1 and S_corr1 for the cosine signal C(θ) and the sine signal S(θ) are 0 and 0, respectively. Based on this assumption, the rotation angle signal θr is calculated as given by Expression (3), and the rotation angle error Δθ is obtained as given below based on the rotation angle signal θr.

$$\Delta\theta=(C0+0.5(c2-b2))\cdot\cos(B)+(-a0+0.5(a2+d2))\cdot\sin(\theta) \quad (13)$$

In the rotation angle error $\Delta\theta$, the coefficients of the rotation angle errors of 1f are different from those of Expression (9) due to the existence of the coefficients a2, b2, c2, and d2 of the second order components included in Expression (11) and Expression (12).

Thus, even when the center point correction values for the sine signal $S(\theta)$ and the cosine signal $C(\theta)$ are obtained, and the correction values C_corr1 and S_corr1 are set to −a0 and −c0, respectively, through the method of Patent Literature 1, the rotation angle errors of 1f caused by a2, b2, c2, and d2 of Expression (13) cannot be suppressed.

In contrast, as described above, the outputs of the correction value calculation unit 52 in the first embodiment are given by Expression (1) and Expression (2).

When the coefficient identified values a0_cal, c0_cal, a2_cal, b2_cal, c2_cal, and d2_cal match a0, c0, a2, b2, c2, and d2, respectively, that is, the coefficient identified values and the true coefficients match each other, Expression (1) and Expression (2) are as given below, respectively.

$$C\_corr1=-a0+0.5(a2+d2) \quad (14)$$

$$S\_corr1=-c0+0.5(b2-c2) \quad (15)$$

When the correction values are used to calculate the rotation angle signal θr in accordance with Expression (3), and the rotation angle error $\Delta\theta$ is further obtained, the rotation angle error $\Delta\theta$ is given as below.

$$\Delta\theta=0.5(b2+c2)\cdot\cos(3\theta)+0.5(-a2+d2)\cdot\sin(3\theta) \quad (16)$$

Thus, in a case in which the 0th order components and the second order components are included in the sine signal $S(\theta)$ and the cosine signal $C(\theta)$, when the correction values C_corr1 and S_corr1 in the first embodiment are applied to calculate the rotation angle signal θr, the rotation angle errors of 3f remain, but the rotation angle errors of 1f become zero.

That is, when the coefficients are correctly identified by the coefficient identification unit 51, even in a case in which the second order components are included in the sine signal $S(\theta)$ and the cosine signal $C(\theta)$, the rotation angle errors of 1f can be zero through use of the correction values C_corr1 and S_corr1 in the first embodiment.

A detailed description is now given of the reason for the point that the coefficients of the sine signal $S(\theta)$ and the cosine signal $C(\theta)$ are correctly identified by the coefficient identification unit 51 in the first embodiment illustrated in FIG. 5.

First, it is assumed that the cosine signal $C(\theta)$ and the sine signal $S(\theta)$ are given as below, respectively.

$$C(\theta)=a0+a1\cdot\cos(\theta)+a2\cdot\cos(2\theta)+b2\cdot\sin(2\theta) \quad (17)$$

$$S(B)=c0+d1\cdot\sin(\theta)+c2\cdot\cos(2\theta)+d2\cdot\sin(2\theta) \quad (18)$$

In the expressions above, when a1 is set to 1 and d1 is set to 1, Expression (17) and Expression (18) match Expression (11) and Expression (12), respectively. That is, Expression (17) and Expression (18) are more generalized forms of Expression (11) and Expression (12).

Average values of the cosine signal $C(\theta)$ and the sine signal $S(\theta)$ over one period of the rotation angle of the motor are given as below, respectively.

$$\text{Ave}\{C(\theta)\}=a0 \quad (19)$$

$$\text{Ave}\{S(\theta)\}=c0 \quad (20)$$

In the above-mentioned expressions, Ave{ } represents an average of elements within curly brackets.

Thus, the coefficient a0 of the DC component of the cosine signal $C(\theta)$ can be obtained by averaging the cosine signal $C(\theta)$ over the one cycle of the rotation angle of the motor, or integrating the cosine signal $C(\theta)$ over the one cycle.

Similarly, the coefficient c0 of the DC component of the sine signal $S(\theta)$ can be obtained by averaging the sine signal $S(\theta)$ over the one cycle of the rotation angle of the motor, or integrating the sine signal $S(\theta)$ over the one cycle.

The coefficient identification unit 51 in the first embodiment is configured to calculate Ave{C(θ)}=a0 and Ave{S(θ)}=c0 through use of low-pass filters each having a time constant equivalent to the integration over the one cycle or having a time constant longer than the integration over the one cycle.

In detail, in FIG. 5, a0 can be identified as a0_cal by applying the low-pass filter 51*a* to the cosine signal $C(\theta)$. Similarly, c0 can be identified as c0_cal by applying the low-pass filter 51*b* to the sine signal $S(\theta)$.

In other words, the coefficient a0 of the 0th order component of the cosine signal $C(\theta)$, that is, the DC component thereof can be identified by applying the low-pass filter 51*a* to the first power of the cosine signal $C(\theta)$, that is, the cosine signal $C(\theta)$ itself.

Similarly, the coefficient c0 of the 0th order component of the sine signal $S(\theta)$, that is, the DC component can be identified by applying the low-pass filter 51*b* to the first power of the sine signal $S(\theta)$, that is, the sine signal $S(\theta)$ itself.

Subsequently, average values over the one cycle of the rotation angle of the motor of the output $C(\theta)^3$ of the multiplier 51*c* of FIG. 5, the output $S(\theta)^3$ of the multiplier 51*h*, the output $C(\theta)^2 S(\theta)$ of the multiplier 51*m*, and the output $C(\theta)S(\theta)^2$ of the multiplier 51*s* are given as below, respectively.

$$\text{Ave}\{C(\theta)^3\}=3\cdot a1^2\cdot(a2+2\cdot a0)/4 \quad (21)$$

$$\text{Ave}\{S(\theta)^3\}=3\cdot d1^2\cdot(-c2+2\cdot c0)/4 \quad (22)$$

$$\text{Ave}\{C(\theta)^2\cdot S(\theta)\}=a1\cdot(2\cdot b2\cdot d1+a1\cdot c2+2\cdot a1\cdot c0)/4 \quad (23)$$

$$\text{Ave}\{C(\theta)\cdot S(\theta)^2\}=d1\cdot(-a2\cdot d1+2\cdot a1\cdot d2+2\cdot a0\cdot d1)/4 \quad (24)$$

X1, X3, X5, and X7 of FIG. 3 are given as below, respectively, by configuring the low-pass filters 51*d*, 51*i*, 51*n*, and 51*t* as low-pass filters each having a time constant equivalent to the integration over the one cycle or a time constant longer than the integration over the one cycle.

$$X1=3a1^2\cdot(a2+2\cdot a0)/4 \quad (25)$$

$$X3=3d1^2\cdot(-c2+2\cdot c0)/4 \quad (26)$$

$$X5=a1\cdot(2\cdot b2\cdot d1+a1\cdot c2+2\cdot a1\cdot c0)/4\approx a1^2\cdot(2\cdot b2+c2+2\cdot c0)/4 \quad (27)$$

$$X7=d1\cdot(-a2\cdot d1+2\cdot a1\cdot d2+2\cdot a0\cdot d1)/4\approx d1^2\cdot(-a2+2\cdot d2+2\cdot a0)/4 \quad (28)$$

Further, X2, X4, X6, and X8 of FIG. 5 are given as below by multiplying the above-mentioned expressions by the gains 51*e*, 51*j*, 51*o*, and 51*u*, respectively.

$$X2=a2+2\cdot a0 \quad (29)$$

$$X4=-c2+2\cdot c0 \quad (30)$$

$$X6=2\cdot b2+c2+2\cdot c0 \quad (31)$$

$$X8=-a2+2\cdot d2+2\cdot a0 \quad (32)$$

Thus, a2_cal is given as below through use of X2 obtained as given by Expression (29), based on the fact that a0_cal matches a0, and through the calculations by the subtractor 51g and the gain 51f.

$$a2\_cal=X2-2\cdot a0\_cal=(a2+2\cdot a0)-2\cdot a0=a2 \qquad (33)$$

Similarly, c2_cal is given as below through use of X4 obtained as given by Expression (30), based on the fact that c0_cal matches c0, and through the calculations by the subtractor 51l and the gain 51k.

$$c2\_cal=-X4+2\cdot c0\_cal=-(-c2+2\cdot c0)+2\cdot c0=c2 \qquad (34)$$

Similarly, b2_cal is given as below through use of X4 obtained as given by Expression (30) and X6 obtained as given by Expression (31), based on the fact that c2_cal matches c2, and through the calculations by the subtractor 51p, the gain 51q, and the subtractor 51r.

$$b2\_cal = 0.5(X6 - X4) - c2\_cal = \qquad (35)$$
$$0.5((2\cdot b2 + c2 + 2\cdot c0) - (-c2 + 2\cdot c0)) - c2 = b2$$

Similarly, d2_cal is given as below through use of X2 obtained as given by Expression (29) and X8 obtained as given by Expression (32), based on the fact that a2_cal matches a2, and through the calculations by the subtractor 51v, the gain 51w, and the adder 51y.

$$d2\_cal = 0.5(X8 - X2) - a2\_cal = \qquad (36)$$
$$0.5((-a2 + 2\cdot d2 + 2\cdot a0) - (a2 + 2\cdot a0)) + a2 = d2$$

As given by Expression (33), Expression (34), Expression (35), and Expression (36), the coefficients a2_cal, b2_cal, c2_cal, and d2_cal of the second order components identified by the configuration of FIG. 5 match the coefficients a2, b2, c2, and d2 of the second order components of Expression (17) and Expression (18), respectively.

As described above, it is shown that the coefficients a0_cal and c0_cal of the 0th order components and the coefficients a2_cal, c2_cal, b2_cal, and d2_cal of the second order components included in the sine signal $S(\theta)$ and the cosine signal $C(\theta)$ are correctly identified by the coefficient identification unit 51 of FIG. 5.

In each low-pass filter of FIG. 5, when the calculation can be executed at a speed equal to or higher than a variation band of the rotation speed of the motor, a high-band cut-off function of the low-pass filter acts more precisely than the integration operation over one cycle of the rotation angle of the motor. As a result, the calculation of Expression (19) to Expression (24) is executed more precisely. Thus, it is preferred that the update of the output values of the low-pass filters 51a, 51b, 51d, 51i, 51n, and 51t be executed at a speed equal to or higher than the variation band of the rotation speed of the motor.

As an example, in a case of a motor to be used to assist in an electric power steering, an upper limit of the variation band of the rotation speed thereof is approximately 5 Hz. Therefore, it is preferred that the output value of each low-pass filter be updated when the number of rotations of the motor corresponds to a frequency equal to or higher than 5 Hz. For this upper limit, when the number of rotations of the motor corresponds to a frequency lower than 5 Hz, it is preferred that a previous value of the output value of each low-pass filter be maintained.

Moreover, in the first embodiment described above, the sine signal $S(\theta)$ and the cosine signal $C(\theta)$ are corrected based on the identification results of the respective coefficients of the 0th order components and second order components, to thereby suppress the rotation angle error $\Delta\theta$. In addition to the above-mentioned configuration, the rotation angle signal $\theta r$ can be corrected also through use of a point that the rotation angle signal $\Delta\theta$ can be given by the following expression.

$$\Delta\theta=((2\cdot co-b2+c2)\cos(\theta)+(-2\cdot a0+a2+d2)\sin(\theta))/(2\cdot a1) \qquad (37)$$

Moreover, the rotation angle detected by the rotation angle detection device 50 described above is the rotation angle of the motor, but an applicable range of the invention according to the first embodiment is not limited to the rotation angle of the motor. The invention according to the first embodiment can be applied to any rotating body, that is, a rotating object.

As described above, the rotation angle detection device according to the first embodiment of the present invention includes: the coefficient identification unit configured to identify, based on a sine signal and a cosine signal which are based on a rotation angle of a rotating body, coefficients of frequency components included in the sine signal and the cosine signal; the correction value calculation unit configured to calculate correction values based on the coefficients identified by the coefficient identification unit; and the rotation angle calculation unit configured to calculate the rotation angle of the rotating body based on values obtained by correcting one of the sine signal or the cosine signa, or both thereof, through use of the correction values 1.

Further, the coefficient identification unit in the first embodiment is configured to identify, for each of integers M and N which satisfy a relationship in which M+N is equal to 1, and each of which is equal to or larger than 0, a coefficient of each of (M+N−1=0)th order components included in the sine signal and the cosine signal, based on results of application of low-pass filters to products of an M-th power of the sine signal and an N-th power of the cosine signal.

Further, the coefficient identification unit in the first embodiment is further configured to identify, for each of integers M and N which satisfy a relationship in which M+N is equal to 3, and each of which is equal to or larger than 0, a coefficient of each of (M+N−1=2)nd order components included in the sine signal and the cosine signal, based on results of application of low-pass filters to products of an M-th power of the sine signal and an N-th power of the cosine signal.

Second Embodiment

Description is now given of a rotation angle detection device 250 according to a second embodiment of the present invention. In embodiments described below, components that are the same as or similar to those in the previous embodiments are denoted by the same reference numerals, and a detailed description thereof is omitted.

Figure 7:
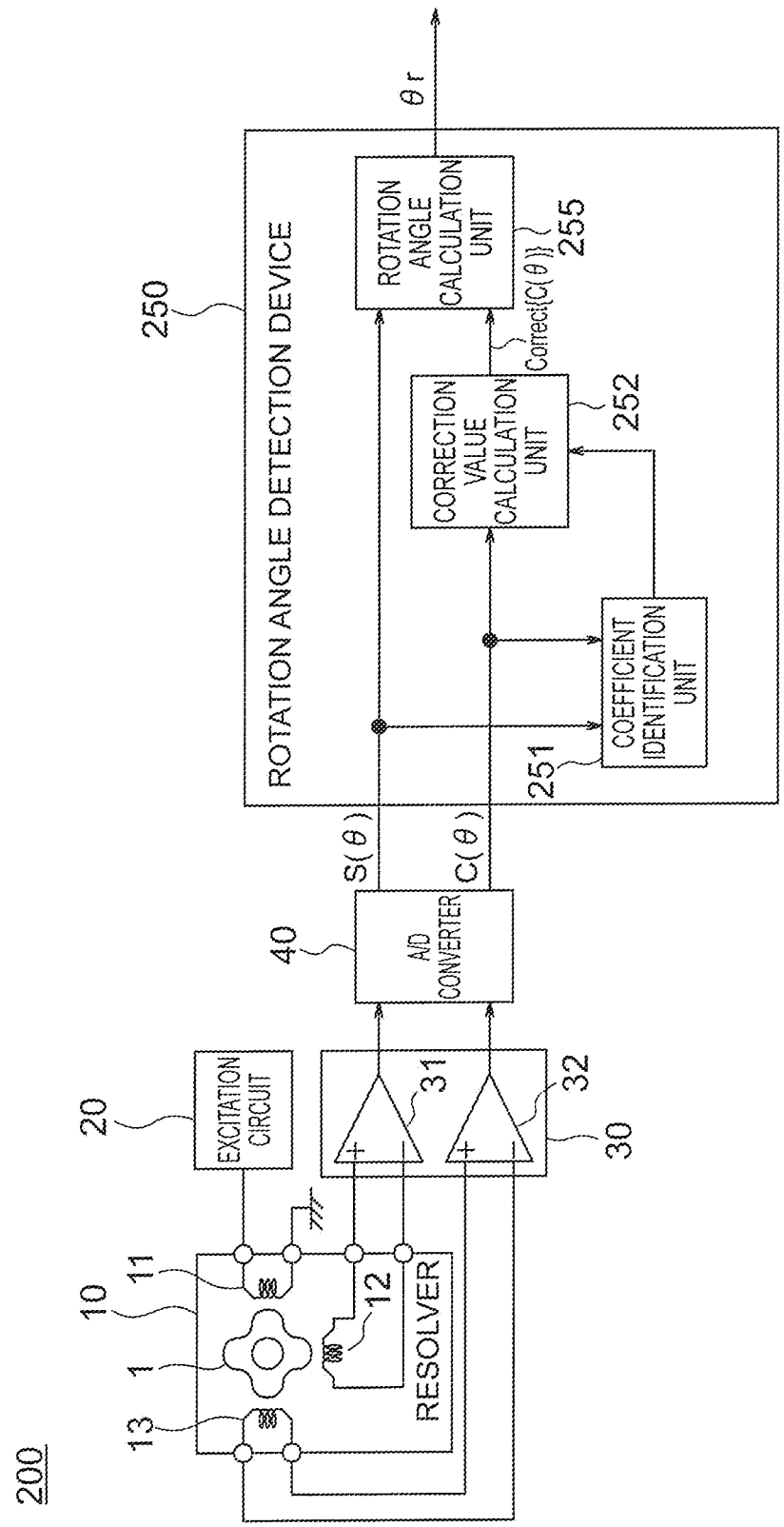
FIG. 7 is a block diagram for illustrating a configuration of a rotation angle detection system including a rotation angle detection device according to a second embodiment of the present invention.

FIG. 7 is a block diagram for illustrating a configuration of a rotation angle detection system 200 including the rotation angle detection device 250 according to the second embodiment of the present invention.

The rotation angle detection device 250 according to the second embodiment includes a coefficient identification unit 251, a correction value calculation unit 252, and a rotation angle calculation unit 255. Description is now given of details of the rotation angle detection device 250 according to the second embodiment in sequence.

First, consideration is given of a case in which the cosine signal $C(\theta)$ and the sine signal $S(\theta)$ are given as below, respectively.

$$C(\theta)=a1\cdot\cos(\theta)+b1\cdot\sin(\theta)+a3\cdot\cos(3\theta)+b3\cdot\sin(3\theta) \quad (38)$$

$$S(\theta)=c1\cdot\cos(\theta)+d1\cdot\sin(\theta)+c3\cdot\cos(3\theta)+d3\cdot\sin(3\theta) \quad (39)$$

At this time, averages of $C(\theta)^2$, $C(\theta)S(\theta)$, and $S(\theta)^2$ are given as below, respectively, by averaging over the one cycle of the rotation angle of the motor.

$$\text{Ave}\{C(\theta)^2\}=a1^2/2 \quad (40)$$

$$\text{Ave}\{C(\theta)S(\theta)\}\approx(b1\cdot d1+a1\cdot c1)/2\approx a1\cdot(b1+c1)/2 \quad (41)$$

$$\text{Ave}\{S(\theta)^2\}=d1^2/2 \quad (42)$$

Further, averages of $C(\theta)^4$, $C(\theta)^3 S(\theta)$, $C(\theta)^2 S(\theta)^2$, $C(\theta)S(\theta)^3$, and $S(\theta)^4$ are given as below, respectively, by averaging over the one cycle of the rotation angle of the motor.

$$\text{Ave}\{C(\theta)^4\} = a1^3 \cdot (3\cdot a1 + 4\cdot a3)/8 \quad (43)$$

$$\text{Ave}\{C(\theta)^3 S(\theta)\} = (a1^3 \cdot (3\cdot c1 + c3) + a1^2 \cdot d1 \cdot (3\cdot b1 + 3\cdot b3))/8 \cong a1^3(3\cdot(b1+c1)+3\cdot b3+c3)/8 \quad (44)$$

$$\text{Ave}\{C(\theta)^2 S(\theta)^2\} = a1\cdot d1\cdot(a1\cdot d1 + 2\cdot a1\cdot d3 - 2\cdot a3\cdot d1)/8 \quad (45)$$

$$\text{Ave}\{C(\theta)S(\theta)^3\} = (d1^3\cdot(3\cdot b1 - b3) + a1\cdot d1^2\cdot(3\cdot c1 - 3\cdot c3))/8 \cong d1^3(3\cdot(b1+c1)-b3-3\cdot c3)/8 \quad (46)$$

$$\text{Ave}\{S(\theta)^4\} = d1^3 \cdot (3\cdot d1 - 4\cdot d3)/8 \quad (47)$$

In Expression (45), d3 and a3 are multiplied by a1 and d1, respectively. As a result, it is preferred to use Expression (43) and Expression (47) to calculate a3 and d3. When, as in Expression (45), the second or higher powers of both of the sine signal $S(\theta)$ and the cosine signal $C(\theta)$ are used, a1 cannot be displaced by d1, or d1 cannot be displaced by a1 through a method of approximation of considering a product of minute coefficients as 0.

It is thus preferred to use an expression including the first or lower powers of one of the sine signal $S(\theta)$ or the cosine signal $C(\theta)$ for the identification of the coefficients. Expression (40) to Expression (44) and Expression (46) and Expression (47) are reorganized as below.

$$a1=\sqrt{2\cdot\text{Ave}\{C(\theta)^2\}} \quad (48)$$

$$d1=\sqrt{2\cdot\text{Ave}\{S(\theta)^2\}} \quad (49)$$

$$b1+c1=2\cdot\text{Ave}\{C(\theta)^4\}/a1^3-3\cdot a1)/4 \quad (50)$$

$$a3=(8\cdot\text{Ave}\{C(\theta)^4\}/a1^3-3\cdot a1)/4 \quad (51)$$

$$b3=(6\cdot\text{Ave}\{C(\theta)^3 S(\theta)\}/a1^3+2\cdot\text{Ave}\{C(\theta)S(\theta)^3\}/d1^3-3(b1+c1))/2 \quad (52)$$

$$c3=(-2\cdot\text{Ave}\{C(\theta)^3 S(\theta)\}/a1^3-6\cdot\text{Ave}\{C(\theta)S(\theta)^3\}/d1^3+3(b1+c1))/2 \quad (53)$$

$$d3=(-8\cdot\text{Ave}\{S(\theta)^4\}/d1^3+3\cdot d1)/4 \quad (54)$$

The coefficient identification unit 251 identifies coefficients of the first order components and the third order components included in the sine signal $S(\theta)$ and the cosine signal $C(\theta)$ based on Expression (48) to Expression (54).

The correction value calculation unit 252 calculates correction values for suppressing the rotation angle errors of 2$f$ caused by the first order components and the third order components included in the sine signal $S(\theta)$ and the cosine signal $C(\theta)$.

For example, the correction value calculation unit 252 calculates correction values G1 and G2 given by Expression (55) and Expression (56), and corrects the cosine signal $C(\theta)$ in accordance with Expression (57). As a result, the correction value calculation unit 252 can suppress the rotation angle errors of 2$f$ caused by the first order components and the third order components included in the sine signal $S(\theta)$ and the cosine signal $C(\theta)$.

$$G1=d1^2/((a1-a3)(d1-d3)) \quad (55)$$

$$G2=(-a1(c1+c3)-d1(b1-b3))/((a1-a3)(d1-d3)) \quad (56)$$

$$\text{Correct}\{C(\theta)\}=G1\cdot C(\theta)+G2\cdot S(\theta) \quad (57)$$

Description has been given of the example in which the correction values for the cosine signal $C(\theta)$ are calculated, but correction values for the sine signal $S(\theta)$ may be calculated. Moreover, the correction values for both of the sine signal $S(\theta)$ and the cosine signal $C(\theta)$ may be calculated. Further, the above-mentioned expressions may be simplified though approximation.

Moreover, in the second embodiment described above, the sine signal $S(\theta)$ and the cosine signal $C(\theta)$ are corrected based on the identification results of the respective coefficients of the first order components and third order components, to thereby suppress the rotation angle error $\Delta\theta$. In addition to the above-mentioned configuration, the rotation angle signal $\theta r$ can be corrected also through use of a point that the rotation angle signal $\Delta\theta$ can be given by the following expression.

$$\Delta\theta=(((b1+c1)-b3+c3)\cos(2\theta)+(-a1+d1+a3+d3)\sin(2\theta))/(2\cdot a1) \quad (58)$$

As described above, the coefficient identification unit in the second embodiment is configured to identify, for each of integers M and N which satisfy a relationship in which M+N is equal to 2, and each of which is equal to or larger than 0, a coefficient of each of (M+N−1=1)st order components included in the sine signal and the cosine signal, based on results of application of low-pass filters to products of an M-th power of the sine signal and an N-th power of the cosine signal.

Further, the coefficient identification unit in the second embodiment is further configured to identify, for each of integers M and N which satisfy a relationship in which M+N is equal to 4, and each of which is equal to or larger than 0, a coefficient of each of (M+N−1=3)rd order components included in the sine signal and the cosine signal, based on results of application of low-pass filters to products of an M-th power of the sine signal and an N-th power of the cosine signal.

Third Embodiment

Figure 8:
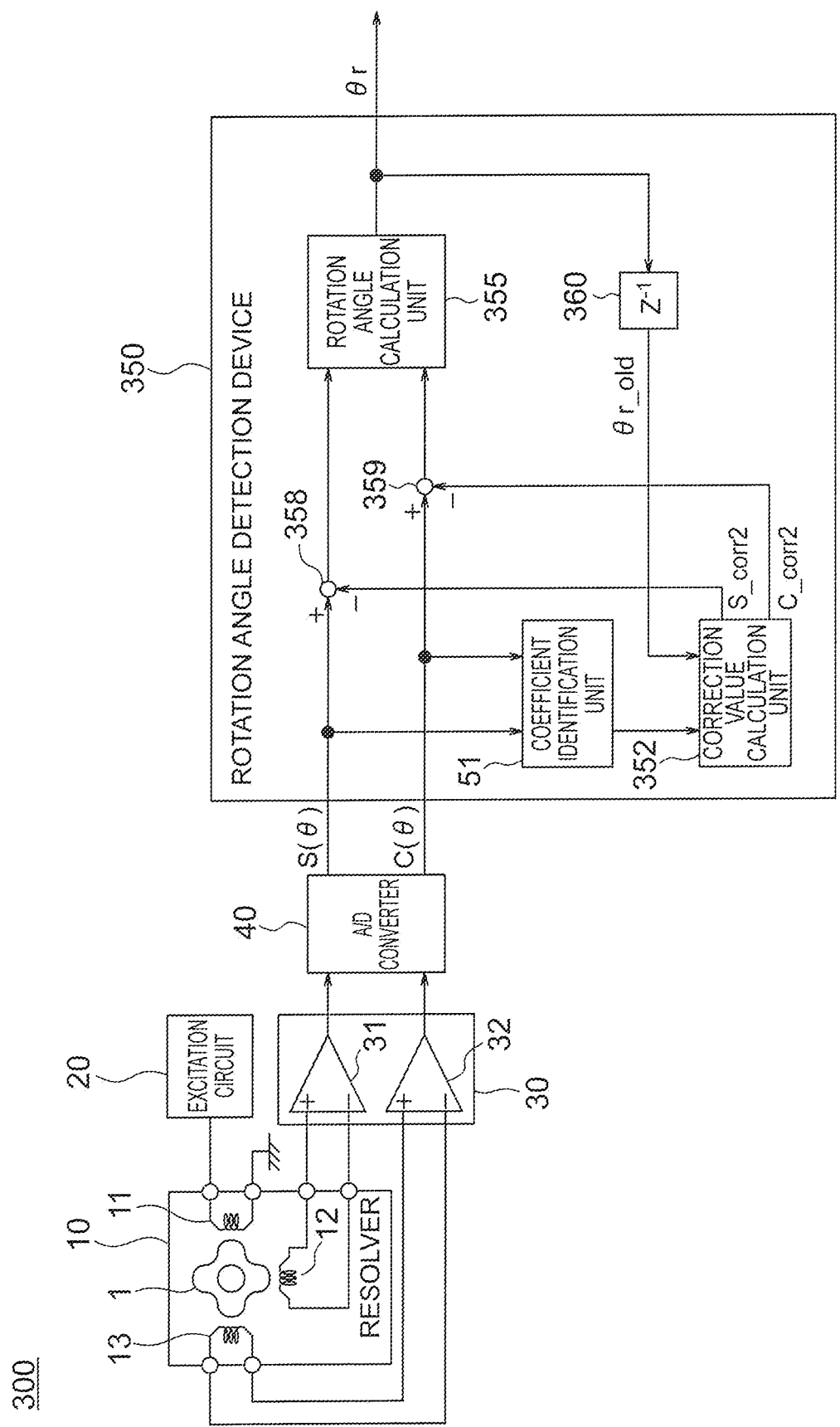
FIG. 8 is a block diagram for illustrating a configuration of a rotation angle detection system including a rotation angle detection device according to a third embodiment of the present invention.

FIG. 8 is a block diagram for illustrating a configuration of a rotation angle detection system 300 including a rotation angle detection device 350 according to a third embodiment of the present invention.

The rotation angle detection device 350 according to the third embodiment includes the coefficient identification unit 51, a correction value calculation unit 357, a subtraction unit 358, a subtraction unit 359, a delay unit 360, and a rotation angle calculation unit 355.

The coefficient identification unit 51 is the same as that in the first embodiment, and outputs the coefficient identified values a0_cal and c0_cal of the 0th order components and the coefficient identified values a2_cal, c2_cal, b2_cal, and d2_cal of the second order components included in the sine signal S(θ) and the cosine signal C(θ).

A correction value calculation unit 352 calculates correction values S_corr2 and C_corr2 based on the coefficients input from the coefficient identification unit 51 and a rotation angle signal θr_old, which is the rotation angle signal θr one calculation cycle before, and is input from the rotation angle calculation unit 355 through the delay unit 360.

The subtraction unit 358 subtracts the correction value S_corr2 calculated by the correction value calculation unit 352 from the sine signal S(θ), and outputs a subtraction result (S(θ)−S_corr2) to the rotation angle calculation unit 355.

The subtraction unit 359 subtracts the correction value C_corr2 calculated by the correction value calculation unit 352 from the cosine signal C(θ), and outputs a subtraction result (C(θ)−C_corr2) to the rotation angle calculation unit 355.

The rotation angle calculation unit 355 calculates the rotation angle signal Or as given by the following expression based on the (S(θ)−S_corr2) and (C(θ)−C_corr2).

$$\theta_r = \tan^{-1}\left(\frac{S(\theta) - S\_\text{corr2}}{C(\theta) - C\_\text{corr2}}\right) \tag{59}$$

Figure 9:
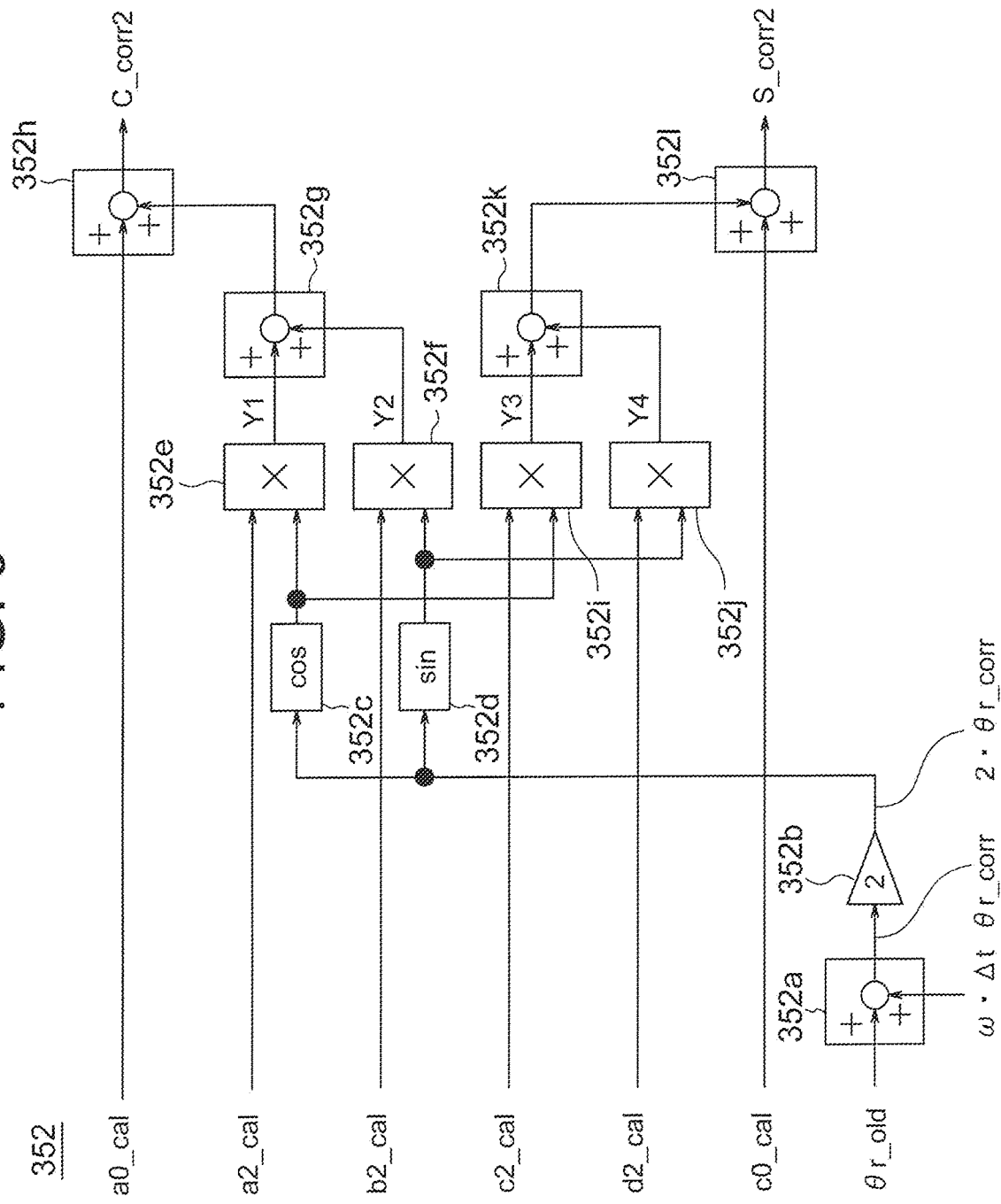
FIG. 9 is a block diagram for illustrating an internal configuration of a correction value calculation unit of FIG. 8.

FIG. 9 is a block diagram for illustrating an internal configuration of the correction value calculation unit 352 in the third embodiment. Description is now given of each component and an operation of the correction value calculation unit 352.

First, an adder 352a outputs the value θr_corr obtained by adding ω·Δt to the rotation angle signal θr_old one calculation cycle before. Symbol Δt represents the calculation cycle at which the rotation angle calculation unit 355 calculates the rotation angle signal θr. Moreover, symbol "ω" represents a rotation angular velocity of the motor. The rotation angular velocity "ω" can be obtained as given by ω=(θr−θr_old)/Δt. Alternatively, the rotation angular velocity "ω" may be estimated by applying rotation speed sensorless control, which is a publicly-known technology, or the like.

The reason for the addition of ω·Δt by the adder 352a is that the rotation angle signal θr_old input to the correction value calculation unit 352 is delayed by the one calculation cycle with respect to the current rotation angle signal θr. The value θr_corr is brought to a value approximately matching the current θr by adding ω·Δt to θr_old.

After that, a gain 352b outputs a value θr_corr×2 being twice the output θr_corr of the adder 352a.

A cosine calculator 352c outputs a cosine value cos (2·θr_corr) of the output θr_corr×2 of the gain 352b.

A sine calculator 352d outputs a sine value sin (2·θr_corr) of the output θr_corr×2 of the gain 352b.

The multiplier 352e outputs a value Y1 obtained by multiplying a2_cal and the output of the cosine calculator 352c by each other. That is, Y1 is given as follows.

$$Y1 = a2\_\text{cal} \cdot \cos(2 \cdot \theta_{r\_corr}) \tag{60}$$

A multiplier 352f outputs a value Y2 obtained by multiplying b2_cal and the output of the sine calculator 352d by each other. That is, Y2 is given as follows $$Y2 = b2\_\text{cal} \cdot \sin(2 \cdot \theta_{r\_corr}) \tag{61}$$

An adder 352g outputs a value Y1+Y2 obtained by adding the output Y1 of the multiplier 352e and the output Y2 of the multiplier 352f to each other.

An adder 352h outputs the value C_corr2 obtained by adding a0_cal and the output Y1+Y2 of the adder 352g to each other. Symbol C_corr2 represents the correction value for the cosine signal C(θ), and is given as below.

$$C\_\text{corr2} = a0\_\text{cal} + Y1 + Y2 = \tag{62}$$
$$a0\_\text{cal} + a2\_\text{cal} \cdot \cos(2 \cdot \theta_{r\_corr}) + b2\_\text{cal} \cdot \sin(2 \cdot \theta_{r\_corr})$$

A multiplier 352i outputs a value Y3 obtained by multiplying c2_cal and the output of the cosine calculator 352c by each other. That is, Y3 is given by as follows.

$$Y3 = c2\_\text{cal} \cdot \cos(2 \cdot \theta_{r\_corr}) \tag{63}$$

A multiplier 352j outputs a value Y4 obtained by multiplying d2_cal and the output of the sine calculator 352d by each other. That is, Y4 is given by as follows.

$$Y4 = d2\_\text{cal} \cdot \sin(2 \cdot \theta_{r\_corr}) \tag{64}$$

An adder 352k outputs a value Y3+Y4 obtained by adding the output Y3 of the multiplier 352i and the output Y4 of the multiplier 352j to each other.

The adder 352l outputs the value S_corr2 obtained by adding c0_cal and the output Y3+Y4 of the adder 352l to each other. Symbol S_corr2 represents the correction value for the sine signal S(θ), and is given as below.

$$C\_\text{corr2} = c0\_\text{cal} + Y3 + Y4 = \tag{65}$$
$$c0\_\text{cal} + c2\_\text{cal} \cdot \cos(2 \cdot \theta_{r\_corr}) + d2\_\text{cal} \cdot \sin(2 \cdot \theta_{r\_corr})$$

A detailed description is now given of a reason for the point that a rotation angle error is suppressed in the rotation angle detection device 350 described above.

First, it is assumed that the cosine signal C(θ) and the sine signal S(θ) are given as below, respectively. Expression (66) and Expression (67) are the same as Expression (11) and Expression (12) described in the first embodiment, respectively.

$$C(\theta) = a0 + \cos(\theta) + a2 \cdot \cos(2\theta) + b2 \cdot \sin(2\theta) \tag{66}$$

$$S(\theta) = c0 + \sin(\theta) + c2 \cdot \cos(2\theta) + d2 \cdot \sin(2\theta) \tag{67}$$

Moreover, as described in the first embodiment, a0_cal=a0, c0_cal=c0, a1 cal=a1, b1 cal=b1, c1 cal=c1, and d1 cal=d1 are given.

Further, as described above, when θr_corr becomes θr, and the rotation angle signal θr matches the actual rotation angle θ of the motor, the correction value C_corr2 of the cosine signal C(θ) and the correction value S_corr2 of the sine signal S(θ) are given as below, respectively.

$$C\_\text{corr2} = a0 + a2 \cdot \cos(2\theta) + b2 \cdot \sin(2\theta) \tag{68}$$

$$S\_\text{corr2} = c0 + c2 \cdot \cos(2\theta) + d2 \cdot \sin(2\theta) \tag{69}$$

Thus, a difference between the cosine signal C(θ) and the correction value C_corr2 and a difference between the sine signal S(θ) and the correction value S_corr2 are given as below, respectively.

$$C(\theta) - C\_\text{corr2} = \cos(\theta) \tag{70}$$

$$S(\theta) - S\_\text{corr2} = \sin(\theta) \tag{71}$$

After that, the rotation angle signal θr is calculated in accordance with Expression (59) as given below.

$$\theta_r = \tan^{-1}\left(\frac{S(\theta) + S\_corr2}{C(\theta) + C\_corr2}\right) = \tan^{-1}\left(\frac{\sin(\theta)}{\cos(\theta)}\right) = \theta \quad (72)$$

Thus, the rotation angle signal θr calculated by the rotation angle calculation unit 355 completely matches the actual rotation angle θ of the motor.

In the first embodiment described above, when the cosine signal C(θ) and the sine signal S(θ) are given by Expression (11) and Expression (12), respectively, the rotation angle errors of 3f cannot be suppressed as given by Expression (16).

Meanwhile, in the third embodiment, when the cosine signal C(θ) and the sine signal S(θ) are given by Expression (66) and Expression (67), respectively, not only the rotation angle errors of if can be zero, but also the rotation angle errors of 3f can be zero.

As described above, the correction value calculation unit in the third embodiment is configured to calculate the correction values based further on the rotation angle signal one calculation cycle before which is input from the rotation angle calculation unit through the delay unit.

Fourth Embodiment

Figure 10:
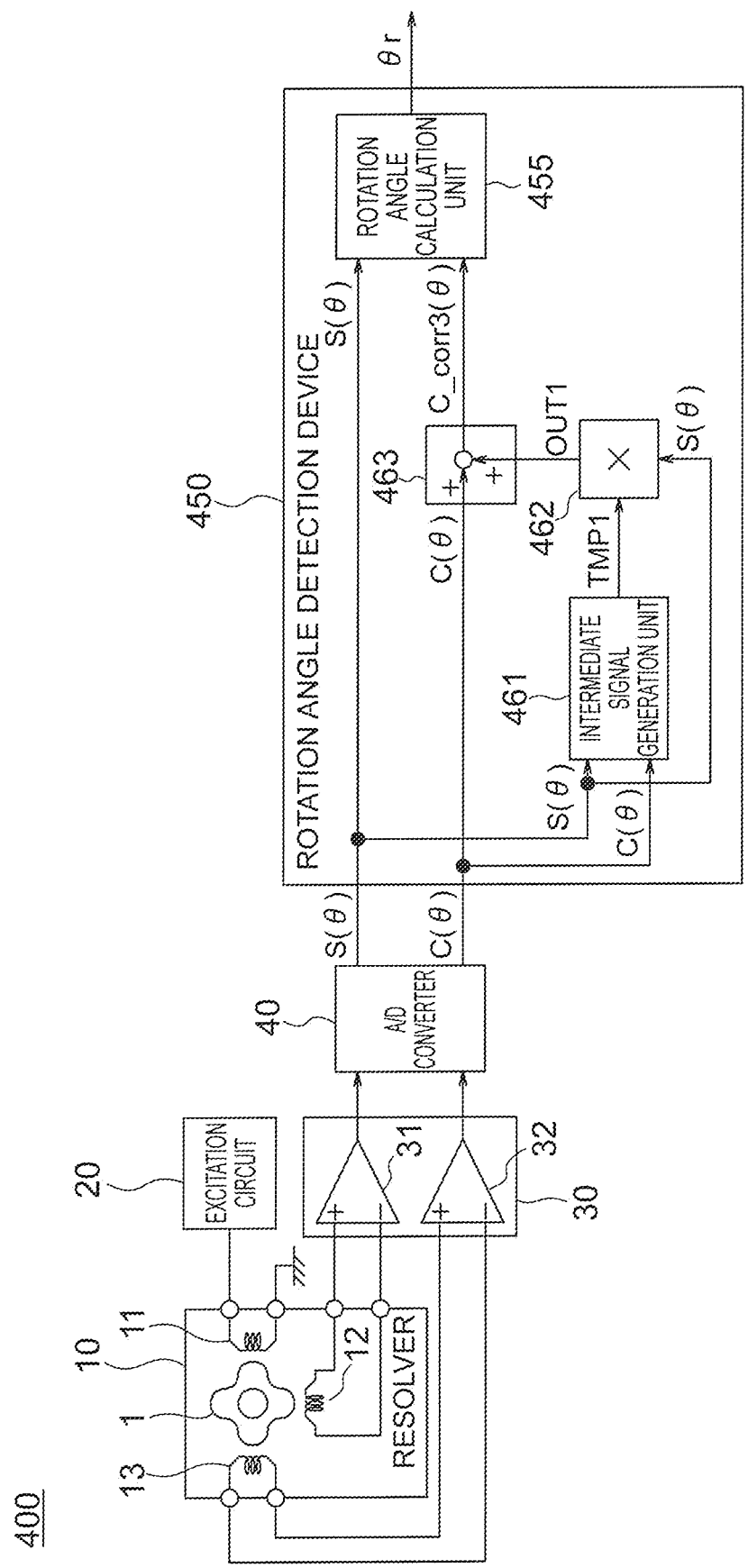
FIG. 10 is a block diagram for illustrating a configuration of a rotation angle detection system including a rotation angle detection device according to a fourth embodiment of the present invention.

FIG. 10 is a block diagram for illustrating a configuration of a rotation angle detection system 400 including a rotation angle detection device 450 according to a fourth embodiment of the present invention.

The rotation angle detection device 450 of the fourth embodiment is configured to identify, for each of integers M and N which satisfy a relationship in which M+N is equal to 2, and each of which is equal to or larger than 0, a coefficient of each of (M+N−1=1)st order components included in the sine signal and the cosine signal, based on a result of application of a low-pass filter to a product of an M-th power of the sine signal and an N-th power of the cosine signal.

The rotation angle detection device 450 includes an intermediate signal generation unit 461, a multiplication unit 462, an addition unit 463, and a rotation angle calculation unit 455. The intermediate signal generation unit 461 is configured to generate an intermediate signal TMP1 based on a product of the sine signal S(θ) and the cosine signal C(θ).

Figure 11:
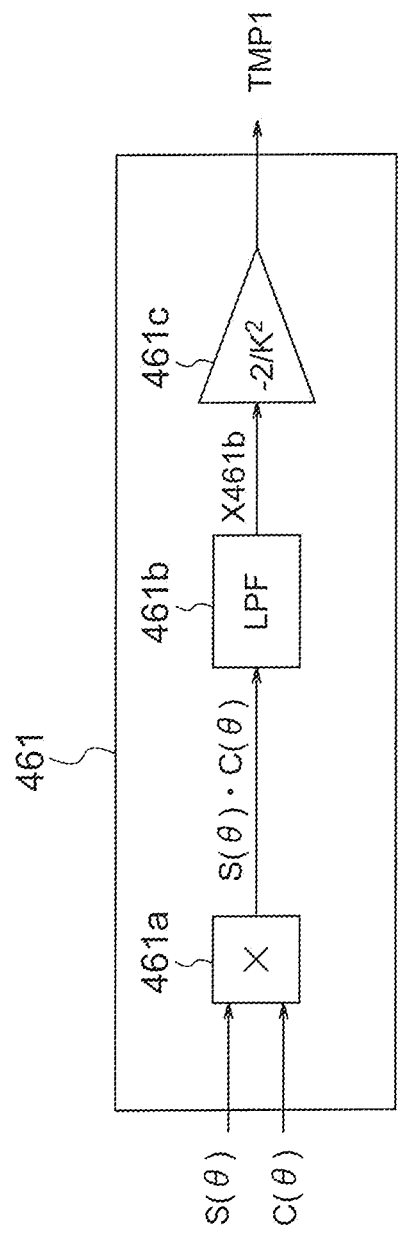
FIG. 11 is a block diagram for illustrating an internal configuration of an intermediate signal generation unit of FIG. 10.

As illustrated in FIG. 11, the intermediate signal generation unit 461 includes a multiplier 461*a*, a low-pass filer (LPF) 461*b*, and a multiplier 461*c*.

The multiplier 461*a* calculates the product S(θ)·C(θ) of the sine signal S(θ) and the cosine signal C(θ). That is, M+N=2.

The cutoff frequency of the low-pass filter 461*b* is set to such a value as to remove frequency components equal to or higher than twice the frequency of the fundamental waves of the sine signal S(θ) and the cosine signal C(θ). Thus, an output X461*b* of the low-pass filter 461*b* is a signal obtained by removing the frequency components equal to or higher than twice the frequency of the fundamental waves of the sine signal S(θ) and the cosine signal C(θ) from the output S(θ)·C(θ) of the multiplier 461*a*.

The multiplier 461*c* multiplies the output X461*b* of the low-pass filter 461*b* by −2/(K×K)=−2/(K²). Thus, the output of the multiplier 461*c*, that is, the output TMP1 of the intermediate signal generation unit 461, is (−2/(K²))·X461*b*. Symbol K represents the amplitude of the sine signal S(θ) or the cosine signal C(θ).

As a method of obtaining K, an amplitude value measured offline in advance may be set to K. Alternatively, as described in Patent Literature 1, the amplitude value can also be calculated by reading, online, the value of the peak and the value of the valley of the sine signal S(θ) or the cosine signal C(θ).

Referring back to FIG. 10, the intermediate signal TMP1 generated by the intermediate signal generation unit 461 is input to the multiplication unit 462. The multiplication unit 462 multiplies the intermediate signal TMP1 by the sine signal S(θ). Thus, an output OUT1 of the multiplication unit 462 is TMP1·S(θ).

The output OUT1 of the multiplication unit 462 is input to the addition unit 463. In the addition unit 463, the cosine signal C(θ) and OUT1 are added to each other. Thus, an output C_corr3(θ) of the addition unit 463 is C(θ)+OUT1.

The output C_corr3(θ)=C(θ)+OUT1 of the addition unit 463 is input to the rotation angle calculation unit 455. Moreover, the sine signal S(θ) is also input to the rotation angle calculation unit 455.

The rotation angle calculation unit 455 calculates the rotation angle signal θr as given by the following expression based on the output C_corr3(θ)=C(θ)+OUT1 of the addition unit 463 and the sine signal S(θ).

$$\theta_r = \tan^{-1}\left(\frac{S(\theta)}{C\_corr3(\theta)}\right) = \tan^{-1}\left(\frac{S(\theta)}{C(\theta) + \text{OUT1}}\right) \quad (73)$$

A detailed description is now given of a reason for the point that a rotation angle error is suppressed in the rotation angle detection device 450 described above.

First, it is assumed that the sine signal S(θ) and the cosine signal C(θ) are given as below, respectively.

$$S(\theta) = K \sin(\theta) \quad (74)$$

$$C(\theta) = K \cos(\theta + \alpha) \quad (75)$$

That is, a phase difference between the sine signal S(θ) and the cosine signal C(θ) is π/2+α [rad]. Moreover, it is assumed that orthogonality between the sine signal S(θ) and the cosine signal C(θ) is reduced due to "α" included in the cosine signal C(θ).

A supplementary description is now given of the orthogonality between the sine signal and the cosine signal. When the phase difference between the sine signal S(θ) and the cosine signal C(θ) matches 90 degrees, it is defined that the sine signal S(θ) and the cosine signal C(θ) are orthogonal to each other, or have the orthogonality. Meanwhile, when the phase difference between the sine signal S(θ) and the cosine signal C(θ) does not match 90 degrees, it is defined that the sine signal S(θ) and the cosine signal C(θ) are not orthogonal to each other, or do not have the orthogonality. Moreover, a state in which the orthogonality is high means that the phase difference between the sine signal S(θ) and the cosine signal C(θ) is close to 90 degrees. A state in which the orthogonality is low means that the phase difference between the sine signal S(θ) and the cosine signal C(θ) is apart from 90 degrees.

When the sine signal S(θ) and the cosine signal C(θ) are directly input to the rotation angle calculation unit 455, and it is assumed that OUT1 is 0, the rotation angle errors of 2f occur in the rotation angle signal θr with respect to the actual rotation angle θ of the motor. It is an object of the fourth embodiment to suppress the rotation angle errors of 2*f*.

Expression (75) is expanded as given below.

$$C(\theta)=K\cos(\theta)\cos(\alpha)-K\sin(\theta)\sin(\alpha) \quad (76)$$

When it is assumed that "α" is sufficiently small, cos(α) is approximated to 1. Thus, Expression (75) can be transformed as follows.

$$C(\theta)=K\cos(\theta)-K\sin(\theta)\sin(\alpha) \quad (77)$$

When the second term on the right side can be removed from Expression (77), the orthogonality between the sine signal S(θ) and the cosine signal C(θ) is improved.

A purpose of the intermediate signal generation unit 461 and the multiplication unit 462 included in the rotation angle detection device 450 is to extract the second term on the right side of Expression (77). As described above, in the intermediate signal generation unit 461, the product S(θ)·C(θ) of the sine signal S(θ) and the cosine signal C(θ) is calculated by the multiplier 461a. The product S(θ)·C(θ) is expanded as given below.

$$S(\theta) \cdot C(\theta) = K\sin(\theta) \cdot K\cos(\theta + \alpha) = \quad (78)$$
$$-\frac{1}{2}K^2\sin(\alpha) + \frac{1}{2}K^2(2\theta)\sin(\alpha) + \frac{1}{2}K^2\cos(2\theta)\sin(\alpha)$$

In Expression (78), the first term on the right side is a DC term defined by "α". Moreover, the second term and the third term on the right side include sin(2θ) and cos(2θ), respectively. The signals sin(2θ) and cos(2θ) oscillate at the frequency twice as high as the frequency of the fundamental waves of the sine signal S(θ) and the cosine signal (θ).

When the signal given by Expression (78) is caused to pass through the low-pass filter 461b, the second term and the third term on the right side of Expression (78) are removed, and hence the output X461b thereof is given as below.

$$X461b=-\tfrac{1}{2}K^2\sin(\alpha) \quad (79)$$

When the signal given by Expression (79) is caused to pass through the multiplier 461c, the output TMP1 thereof is given as below.

$$TMP1=\sin(\alpha) \quad (80)$$

When the intermediate signal TMP1 given by Expression (80) is caused to pass through the multiplication unit 462 of the rotation angle detection device 450, the output OUT1 thereof is given as below.

$$OUT1=\sin(\alpha)\cdot K\sin(\theta) \quad (81)$$

It is understood that −1 time Expression (81) matches the second term on the right side of Expression (77).

In the addition unit 463 of the rotation angle detection device 450, the following calculation is executed.

$$C\_corr3(\theta) = C(\theta) + OUT1 = K\cos(\theta+\alpha) + \sin(\alpha)K\sin(\theta) = K\cos(\theta) \quad (82)$$

As described above, the sine signal S(θ) given by Expression (74) and the cosine signal C(θ) given by Expression (75) are not orthogonal to each other, but the second term on the right side of Expression (77) is removed by the above-mentioned calculation. As a result, the sine signal S(θ) given by Expression (74) and a signal given by Expression (82), which is orthogonal to the sine signal S(θ), are input to the rotation angle calculation unit 455.

The following calculation is executed in the rotation angle calculation unit 455, and the rotation angle errors of 2*f* are consequently suppressed.

$$\theta_r = \tan^{-1}\left(\frac{S(\theta)}{C\_corr3(\theta)}\right) = \tan^{-1}\left(\frac{K\sin(\theta)}{K\cos(\theta)}\right) \quad (83)$$

The configuration of the rotation angle detection device 450 described above is such that the intermediate signal TMP1 is generated based on the product S(θ)·C(θ) of the sine signal S(θ) and the cosine signal C(θ), the intermediate signal TMP1 is multiplied by the sine signal S(θ), and the result OUT 1 of the multiplication and the cosine signal C(θ) are added to each other.

However, the configuration of the fourth embodiment is not limited to this example. For example, the sine signal S(θ) and the cosine signal C(θ) can also be given by as follows.

$$S(\theta)=K\sin(\theta+\alpha) \quad (84)$$

$$C(\theta)=K\cos(\theta) \quad (85)$$

In this case, the configuration of the rotation angle detection device 450 is such that the intermediate signal TMP1 is generated based on the product S(θ)·C(θ) of the sine signal S(θ) and the cosine signal C(θ), the intermediate signal TMP1 is multiplied by the cosine signal C(θ), and the result OUT1 of the multiplication is subtracted from the sine signal S(θ).

In summary, the rotation angle detection device according to the fourth embodiment of the present invention includes: the intermediate signal generation unit configured to generate an intermediate signal based on a product of a sine signal and a cosine signal which are based on a rotation angle of a rotating body; the multiplication unit configured to multiply the intermediate signal by one of the sine signal or the cosine signal; the addition/subtraction unit configured to add the other one of the sine signal or the cosine signal and an output of the multiplication unit to each other or to subtract the output of the multiplication unit from the other one of the sine signal or the cosine signal; and the rotation angle calculation unit configured to calculate the rotation angle of the rotating body based on the one of the sine signal or the cosine signal and on an output of the addition/subtraction unit.

Further, the intermediate signal generation unit includes: a multiplier configured to calculate the product of the sine signal and the cosine signal; and a low-pass filter configured to remove frequency components equal to or higher than twice a frequency of fundamental waves of the sine signal and the cosine signal from an output of the multiplier.

Fifth Embodiment

Figure 12:
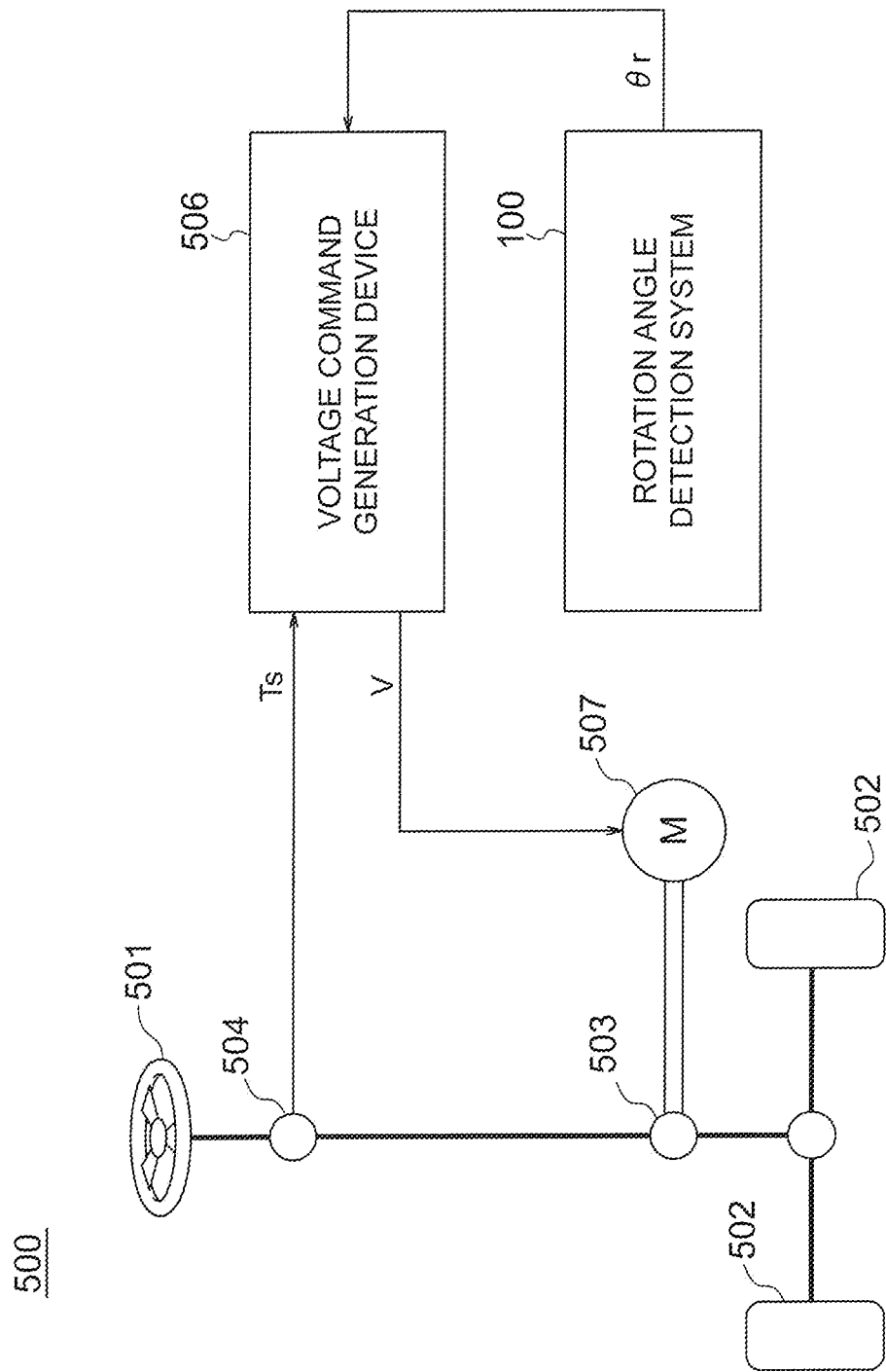
FIG. 12 is a block diagram for illustrating a configuration of an electric power steering device according to a fifth embodiment of the present invention.

FIG. 12 is a block diagram for illustrating a configuration of an electric power steering device 500 according to a fifth embodiment of the present invention.

The electric power steering device 500 according to the fifth embodiment is configured to generate an assist torque for assisting a steering torque of a steering system of a vehicle based on the rotation angle signal θr output from the rotation angle detection system 100 in the first embodiment.

The electric power steering device 500 includes the rotation angle detection system 100, a steering wheel 501, front wheels 502, gears 503, a torque detector 504, a voltage command generation device 506, and an AC motor 507.

The AC motor 507 generates the assist torque for assisting the steering torque of the steering system through intermediation of the gears 503.

The rotation angle detection system 100 detects the rotation angle of the AC motor 507, and outputs the rotation angle signal θr.

A driver of the vehicle operates the steering wheel 501, to thereby steer the front wheels 502.

The torque detector 504 detects a steering torque Ts of the steering system.

The volage command generation device 506 determines a drive voltage V to be applied to the AC motor 507 based on the steering torque Ts detected by the torque detector 504 and on the rotation angle signal θr output from the rotation angle detection system 100.

In detail, first, the voltage command generation device 506 calculates a current command value for the AC motor 507 based on the steering torque Ts. After that, the voltage command generation device 506 calculates a voltage command value based on the current command value and the rotation angle signal Gr. Finally, the voltage command generation device 506 controls a power converter, for example, an inverter, based on the voltage command value, to thereby determine a drive voltage V to be applied to the AC motor 507.

In order to achieve the above-mentioned control, it is only required to use a publicly-known technology of, for example, independently providing a current sensor configured to detect the current flowing through the AC motor 507, and calculating the voltage command value based on a difference between the current command value and a detection value of the current sensor.

In general, in the electric power steering device, detection precision of the rotation angle of the AC motor 507 is important.

For example, it is assumed that rotation angle errors of $2f$ occur between the rotation angle signal θr output from the rotation angle detection system 100 and the actual rotation angle θ of the AC motor 507. In this case, the voltage command generation device 506 applies the drive voltage V including the rotation angle errors of $2f$ to the AC motor. As a result, components of the rotation angle errors of $2f$ are mixed with the torque to be generated by the AC motor 507, resulting in occurrence of ripples, vibration, noise, and the like.

Thus, in the electric power steering device, the precision of the rotation angle signal θr output from the rotation angle detection system 100 is very important. In the fifth embodiment, the rotation angle signal θr can highly precisely be calculated by using the rotation angle detection system 100 in the first embodiment.

Even when the rotation angle detection systems in the second to fourth embodiments are used in place of the rotation angle detection system 100 in the first embodiment, effects equivalent to or higher than those of the fifth embodiment can be obtained.

Moreover, in the first to fifth embodiments described above, the resolver is used as means for detecting the rotation angle of the motor. However, the applicable range of the first to fifth embodiments is not limited to the resolver. The first to fifth embodiments can similarly be applied to another detection means for outputting the sine signal and the cosine signal corresponding to the rotation angle of the motor, such as an MR sensor and an encoder.

Figure 13:
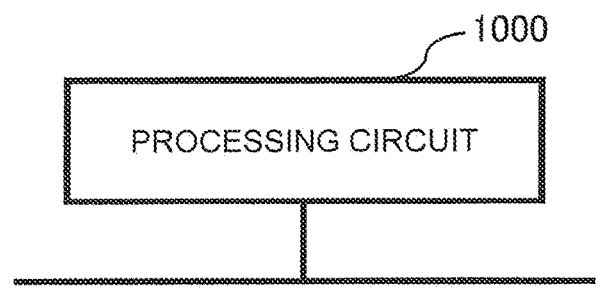
FIG. 13 is a configuration diagram for illustrating a case in which each function of the rotation angle detection devices according to the first embodiment to the fifth embodiment of the present invention is implemented by a processing circuit which is dedicated hardware.
Figure 14:
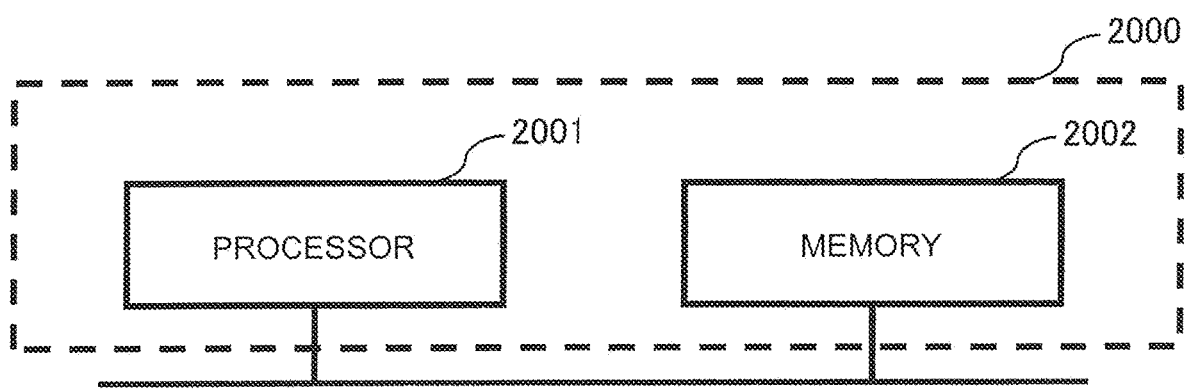
FIG. 14 is a configuration diagram for illustrating a case in which each function of the rotation angle detection devices according to the first embodiment to the fifth embodiment of the present invention is implemented by a processing circuit which includes a processor and a memory.

Moreover, each function of the rotation angle detection devices according to the first to fifth embodiments described above is implemented by a processing circuit. The processing circuit configured to implement each function may be dedicated hardware or a processor configured to execute a program stored in a memory. FIG. 13 is a configuration diagram for illustrating a case in which each function of the rotation angle detection devices according to the first to fifth embodiments of the present invention is implemented by a processing circuit 1000 which is dedicated hardware. Moreover, FIG. 14 is a configuration diagram for illustrating a case in which each function of the rotation angle detection devices according to the first to fifth embodiments of the present invention is implemented by a processing circuit 2000 which includes a processor 2001 and a memory 2002.

When the processing circuit is dedicated hardware, the processing circuit 1000 corresponds to, for example, a single circuit, a composite circuit, a programmed processor, a parallel-programmed processor, an application specific integrated circuit (ASIC), field programmable gate array (FPGA), or a combination thereof. The function of each of the units of the rotation angle detection device may be implemented by an individual processing circuit 1000, or the functions of the respective units may be implemented collectively by the processing circuit 1000.

Meanwhile, when the processing circuit is the processor 2001, the functions of the respective units of the rotation angle detection device are implemented by software, firmware, or a combination of software and firmware. The software and the firmware are written as programs, and stored in the memory 2002. The processor 2001 reads out and executes the program stored in the memory 2002, to thereby implement the function of each unit. That is, the rotation angle detection device includes the memory 2002 for storing programs for causing the above-mentioned respective control procedures to be executed resultantly when being executed by the processing circuit 2000.

In other words, those programs cause the computer to execute the above-mentioned procedures or methods for the respective units. In this case, the memory 2002 corresponds to, for example, a random access memory (RAM), a read only memory (ROM), a flash memory, an erasable programmable read only memory (EPROM), an electrically erasable and programmable read only memory (EEPROM), or other such non-volatility or volatile semiconductor memory. Further, the memory 2002 also corresponds to a magnetic disk, a flexible disk, an optical disc, a compact disc, a MiniDisk, a DVD, or the like.

Some parts of the functions of the respective units described above may be implemented by dedicated hardware, and other parts thereof may be implemented by software or firmware.

In this manner, the processing circuit can implement the functions of the respective units described above by hardware, software, firmware, or a combination thereof.

REFERENCE SIGNS LIST 50, 250, 350, 450 rotation angle detection device, 51, 251 coefficient identification unit, 52, 252, 352 correction value calculation unit, 55, 255, 355, 455 rotation angle calculation unit, 360 delay unit, 461 intermediate signal generation unit, 462 multiplication unit, 463 addition unit (addition/subtraction unit), 500 electric power steering device, 507 AC motor (rotating body), S(θ) sine signal, C(θ) cosine signal, θr rotation angle signal

The invention claimed is:

1. An electric power steering device, comprising a rotation angle detection device, the rotation detection device comprising:
a coefficient identification circuitry configured to identify, based on a sine signal and a cosine signal which are based on a rotation angle of a motor, coefficients of frequency components included in the sine signal and the cosine signal, wherein identifying the coefficients includes application of low-pass filters to products of an M-th power of the sine signal and an N-th power of the cosine signal;
a correction value calculator configured to calculate correction values based on the coefficients identified by the coefficient identification circuitry; and
a rotation angle calculator configured to calculate the rotation angle of the motor based on values obtained by correcting one of the sine signal or the cosine signal, or both thereof, through use of the correction values;
wherein the electric power steering device is configured to cause the motor to generate an assist torque based on the rotation angle of the motor.

2. The electric power steering device according to claim 1, wherein the coefficient identification circuitry is configured to identify, for each of integers M and N which satisfy a relationship in which M+N is equal to a positive constant, and each of which is equal to or larger than 0, a coefficient of each of (M+N−1)th order components included in the sine signal and the cosine signal, based on results of application of the low-pass filters to products of an M-th power of the sine signal and an N-th power of the cosine signal.

3. The electric power steering device according to claim 2, wherein the coefficient identification circuitry is configured to identify, for each of integers M and N which satisfy a relationship in which M+N is equal to 1, and each of which is equal to or larger than 0, a coefficient of each of (M+N−1=0)th order components included in the sine signal and the cosine signal, based on results of application of low-pass filters to products of an M-th power of the sine signal and an N-th power of the cosine signal.

4. The electric power steering device according to claim 3, wherein the coefficient identification circuitry is further configured to identify, for each of integers M and N which satisfy a relationship in which M+N is equal to 3, and each of which is equal to or larger than 0, a coefficient of each of (M+N−1=2)nd order components included in the sine signal and the cosine signal, based on results of application of low-pass filters to products of an M-th power of the sine signal and an N-th power of the cosine signal.

5. The electric power steering device according to claim 4, wherein the correction value calculator is configured to calculate the correction values based further on a rotation angle signal one calculation cycle before which is input from the rotation angle calculator through a delay circuitry.

6. The electric power steering device according to claim 2, wherein the coefficient identification circuitry is configured to identify, for each of integers M and N which satisfy a relationship in which M+N is equal to 2, and each of which is equal to or larger than 0, a coefficient of each of $(M+N-1=1)^{st}$ order components included in the sine signal and the cosine signal, based on results of application of low-pass filters to products of an M-th power of the sine signal and an N-th power of the cosine signal.

7. The electric power steering device according to claim 6, wherein the coefficient identification circuitry is further configured to identify, for each of integers M and N which satisfy a relationship in which M+N is equal to 4, and each of which is equal to or larger than 0, a coefficient of each of (M+N−1=3)rd order components included in the sine signal and the cosine signal, based on results of application of low-pass filters to products of an M-th power of the sine signal and an N-th power of the cosine signal.

8. The electronic power steering device according to claim 1, wherein identifying coefficients of frequency components included in the sine signal and the cosine signal includes correcting the amplitude of the sine signal and cosine signal such that the difference between the sine signal and cosine signal approaches zero.

* * * * *